United States Patent
Ko

(10) Patent No.: US 12,041,662 B2
(45) Date of Patent: Jul. 16, 2024

(54) METHOD FOR TERMINAL TO PERFORM RANDOM ACCESS CHANNEL PROCEDURE IN WIRELESS COMMUNICATION SYSTEM, AND DEVICE FOR SAME

(71) Applicant: LG Electronics Inc., Seoul (KR)

(72) Inventor: Hyunsoo Ko, Seoul (KR)

(73) Assignee: LG Electronics Inc., Seoul (KR)

(*) Notice: Subject to any disclaimer, the term of this patent is extended or adjusted under 35 U.S.C. 154(b) by 318 days.

(21) Appl. No.: 17/430,786

(22) PCT Filed: Feb. 17, 2020

(86) PCT No.: PCT/KR2020/002210
§ 371 (c)(1),
(2) Date: Aug. 13, 2021

(87) PCT Pub. No.: WO2020/167084
PCT Pub. Date: Aug. 20, 2020

(65) Prior Publication Data
US 2022/0124820 A1    Apr. 21, 2022

Related U.S. Application Data

(60) Provisional application No. 62/806,634, filed on Feb. 15, 2019.

(51) Int. Cl.
*H04W 74/0833* (2024.01)
*H04W 56/00* (2009.01)
*H04W 74/00* (2009.01)

(52) U.S. Cl.
CPC ... *H04W 74/0833* (2013.01); *H04W 56/0045* (2013.01); *H04W 74/008* (2013.01)

(58) Field of Classification Search
CPC ......... H04W 74/0833; H04W 56/0045; H04W 74/008; H04W 74/002; H04W 76/11; H04L 1/00; H04L 5/0048; H04L 1/0025
See application file for complete search history.

(56) References Cited

U.S. PATENT DOCUMENTS

2020/0107372 A1* 4/2020 Agiwal ................. H04W 24/08
2020/0120713 A1* 4/2020 Yerramalli ........ H04W 74/0833
2020/0260485 A1* 8/2020 Lei .......................... H04L 1/189

FOREIGN PATENT DOCUMENTS

| CN | 104168663 | 11/2014 |
|---|---|---|
| CN | 104244295 | 12/2014 |

(Continued)

OTHER PUBLICATIONS

Office Action in Chinese Appln. No. 202080026041.1, mailed on Jun. 23, 2023, 15 pages (with English translation).

(Continued)

*Primary Examiner* — Thai Nguyen
(74) *Attorney, Agent, or Firm* — Fish & Richardson P.C.

(57) ABSTRACT

Disclosed is a method by which a terminal performs a random access channel (RACH) procedure in a wireless communication system. In particular, the method includes: transmitting message A including a physical random access channel (PRACH) preamble and a physical uplink shared channel (PUSCH); and receiving message B including contention resolution information, in response to message A, wherein the contention resolution information included in message B can be received on the basis of the terminal having acquired information about a random access preamble identifier (RAPID) for the PRACH preamble, and information providing notification of the successful reception of the PUSCH.

12 Claims, 30 Drawing Sheets

(56) References Cited

FOREIGN PATENT DOCUMENTS

EP      2770792     8/2014
WO   WO2017/218762  12/2017

OTHER PUBLICATIONS

3rd Generation Partnership Project; Technical Specification Group Radio Access Network; NR; "Medium Access Control (MAC) protocol specification (Release 15)," 3GPP TS 38.321 V15.4.0 (Dec. 2018), 79 pages.
ZTE Corporation, Sanechips, "New work item: 2-step RACH for NR," RP-182894, 3GPP TSG RAN Meeting #82, Sorrento, Italy, Dec. 10-13, 2018, 7 pages.
ZTE Corporation, Sanechips, "Msg2 payload contents for 2-step RACH," R2-1817064, 3GPP TSG-RAN WG2 Meeting#104, Spokane, USA, Nov. 12-16, 2018, 11 pages.
MediaTek Inc., "Further considerations on 2-step RACH," R2-1813965, 3GPP TSG-RAN WG2 Meeting #103bis, Chengdu, China, Oct. 8-12, 2018, 9 pages.
International Search Report and Written Opinion in International Appln. No. PCT/KR2020/002210, dated Jun. 11, 2020, 15 pages (with English translation).

\* cited by examiner (A) CONTROL-PLANE PROTOCOL STACK (B) USER-PLANE PROTOCOL STACK

METHOD FOR TERMINAL TO PERFORM RANDOM ACCESS CHANNEL PROCEDURE IN WIRELESS COMMUNICATION SYSTEM, AND DEVICE FOR SAME

CROSS-REFERENCE TO RELATED APPLICATIONS

This application is a National Stage application under 35 U.S.C. § 371 of International Application No. PCT/KR2020/002210, filed on Feb. 17, 2020, which claims the benefit of U.S. Provisional Application No. 62/806,634, filed on Feb. 15, 2019. The disclosures of the prior applications are incorporated by reference in their entirety

TECHNICAL FIELD

The present disclosure relates to a method of performing a random access channel (RACH) procedure by a user equipment (UE) in a wireless communication system and apparatus therefor, and more particularly, to a method of performing a 2-step RACH procedure or fall-back to a 4-step RACH procedure by a UE in a wireless communication system and apparatus therefor.

BACKGROUND ART 5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with re-constructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

DISCLOSURE

Technical Problem

The object of the present disclosure is to provide a method of performing a 2-step random access channel (RACH) procedure or fall-back to a 4-step RACH procedure and apparatus therefor.

Additional aspects will be set forth in part in the description which follows and, in part, will be apparent from the description, or may be learned by practice of the presented embodiments of the present disclosure.

Technical Solution

In an aspect of the present disclosure, a method of performing a random access channel (RACH) procedure in a wireless communication system is provided. The method may include: transmitting a message A including a physical random access channel (PRACH) preamble and a physical uplink shared channel (PUSCH) to a base station; and receiving a message B including contention resolution information from the base station in response to the message A. The contention resolution information included in the message B may be received based on that a user equipment (UE) obtains information on a random access preamble identifier (RAPID) for the PRACH preamble and information on success of reception of the PUSCH.

The information on the RAPID and information on success or failure of reception of the PUSCH may be included in a random access response (RAR) monitored by the UE.

The RAR may further include information on a temporary cell radio network temporary identifier (TC-RNTI) and a timing advance (TA).

Based on that the information on the RAPID is not included in the RAR, retransmission of the message A may be performed by the UE.

Based on that the information on the RAPID and information on the failure of reception of the PUSCH are included in the RAR, information instructing retransmission of the PUSCH and an uplink (UL) grant may be included in the RAR.

Transmission of a message 3 including the PUSCH may be performed by the UE based on the RAR.

The UE may be configured to communicate with at least one of the base station, a UE other than the UE, a network, or an autonomous driving vehicle.

In another aspect of the present disclosure, an apparatus configured to perform a RACH procedure in a wireless communication system is provided. The apparatus may include: at least one processor; and at least one memory operably connected to the at least one processor and configured to store instructions that, when executed, cause the at least one processor to perform operations including: transmitting a message A including a PRACH preamble and a PUSCH; and receiving a message B including contention resolution information in response to the message A. The contention resolution information included in the message B may be received based on that a UE obtains information on a RAPID for the PRACH preamble and information on success of reception of the PUSCH.

The information on the RAPID and information on success or failure of reception of the PUSCH may be included in an RAR monitored by the apparatus.

The RAR may further include information on a TC-RNTI and a TA.

Based on that the information on the RAPID is not included in the RAR, retransmission of the message A may be performed by the apparatus.

Based on that the information on the RAPID and information on the failure of reception of the PUSCH are included in the RAR, information instructing retransmission of the PUSCH and a UL grant may be included in the RAR.

Transmission of a message 3 including the PUSCH may be performed by the apparatus based on the RAR.

The apparatus may be configured to communicate with at least one of a UE, a base station, a network, or an autonomous driving vehicle.

Advantageous Effects

According to the present disclosure, a user equipment (UE) may smoothly perform a 2-step random access channel (RACH) procedure or a 4-step RACH procedure in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
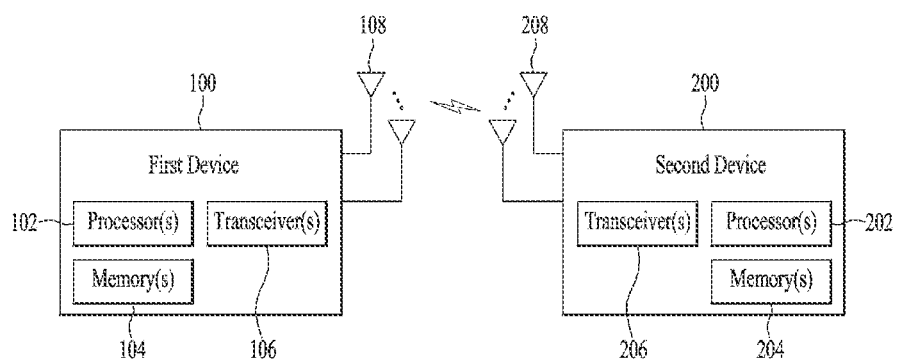
FIGS. 1 to 4 illustrate examples of various wireless devices to which embodiments of the present disclosure are applied.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary.

Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates wireless devices applicable to the present disclosure.

Referring to FIG. 1, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including commands for performing all or a part of processes controlled by the processor(s) 102 or for performing the descriptions, functions, procedures, proposals, methods, and/or operational flowcharts disclosed in this document. Herein, the processor(s) 102 and the memory(s) 104 may be part of a communication modem/circuit/chip designed to implement RAT (e.g., LTE or NR). The transceiver(s) 106 may be connected to the processor(s) 102 and transmit and/or receive radio signals through the one or more antennas 108. Each of the transceiver(s) 106 may include a transmitter and/or a receiver. The transceiver(s) 106 may be interchangeably used with RF unit(s). In the present disclosure, a wireless device may refer to a communication modem/circuit/chip.

Specifically, commands stored in a memory 104 and/or operations, which are controlled by a processor 102 of the second wireless device 100 according to an embodiment of the present disclosure will be described below.

While the following operations are described in the context of control operations of the processor 102 from the perspective of the processor 102, software code for performing these operations may be stored in the memory 104.

The processor 102 may control a transceiver 106 to transmit a PRACH and a PUSCH in Msg A. The processor 102 may control the transceiver 106 to receive Msg B related to contention resolution. A specific method of controlling the transceiver 106 to transmit Msg A and receive Msg B by the processor 102 may be based on the foregoing embodiments.

Specifically, commands stored in a memory 204 and/or operations, which are controlled by a processor 202 of the second wireless device 200 according to an embodiment of the present disclosure will be described below.

While the following operations are described in the context of control operations of the processor 202 from the perspective of the processor 202, software code for performing these operations may be stored in the memory 204.

A processor 202 may control a transceiver 206 to receive a PRACH and a PUSCH in Msg A. The processor 202 may control the transceiver 206 to transmit Msg B related to contention resolution. A specific method of controlling the transceiver 106 to receive Msg A and transmit Msg B by the processor 202 may be based on the foregoing embodiments.

Hardware elements of the wireless devices 100 and 200 will be described in more detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive signals (e.g., baseband signals) from the one or more transceivers 106 and 206 and acquire PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, instructions, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, and/or radio signals/channels mentioned in the methods and/or operational flowcharts of this document. The one or more transceivers 106 and 206 may receive, from one or more other devices, user data, control information, and/or radio signals/channels mentioned in the descriptions, functions, procedures, proposals, methods, and/or operational flowcharts disclosed in this document. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be connected to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels from RF band signals into baseband signals in order to process received user data, control information, and radio signals/channels using the one or more processors 102 and 202. The one or more transceivers 106 and 206 may convert the user data, control information, and radio signals/channels processed using the one or more processors 102 and 202 from the base band signals into the RF band signals. To this end, the one or more transceivers 106 and 206 may include (analog) oscillators and/or filters.

Figure 2:
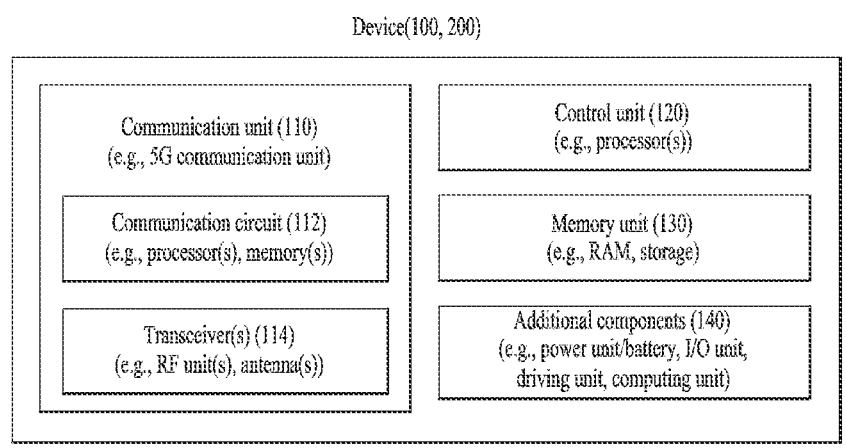

FIG. 2 illustrates another exemplary a wireless device applied to the present disclosure. The wireless device may be implemented in various forms according to a use case/service (refer to FIG. 30).

Referring to FIG. 2, wireless devices 100 and 200 may correspond to the wireless devices 100 and 200 of FIG. 1 and may be configured with various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 1. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) through the communication unit 110 via a wireless/wired interface or store, in the memory unit 130, information received from the outside (e.g., other communication devices) through the communication unit 110 via the wireless/wired interface. Therefore, a specific operation of the control unit 120 and programs/code/commands/information stored in the memory unit 130 according to the present disclosure may corresponding to at least one operation of the processors 102 and 202 and at least one operation of the memories 104 and 204 illustrated in FIG. 2.

The additional components 140 may be configured in various ways according to the type of wireless device. For example, the additional components 140 may include at least one of a power unit/battery, input/output (I/O) unit, a driving unit, or a computing unit. The wireless device may be implemented in the form of, but not limited to, the robot (100*a* of FIG. 30), the vehicles (100*b*-1 and 100*b*-2 of FIG. 30), the XR device (100*c* of FIG. 30), the hand-held device (100*d* of FIG. 30), the home appliance (100*e* of FIG. 30), the IoT device (100*f* of FIG. 30), a digital broadcasting terminal, a hologram device, a public safety device, an MTC device, a medical device, a FinTech device (or a financial machine), a security device, a climate/environment device, the AI server/device (400 of FIG. 30), a BS (200 of FIG. 30), a network node, or the like. The wireless device may be used in a mobile or fixed place according to a use case/service.

In FIG. 2, all of the various elements, components, units/portions, and/or modules in the wireless devices 100 and 200 may be inter-connected through a wired interface or at least a part thereof may be wirelessly inter-connected through the communication unit 110. For example, in each of the wireless devices 100 and 200, the control unit 120 and the communication unit 110 may be connected by wire, and the control unit 120 and first units (e.g., 130 and 140) may be connected wirelessly through the communication unit 110. Each element, component, unit/portion, and/or module in the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a RAM, a DRAM, a ROM, a flash memory, a volatile memory, a non-volatile memory, and/or a combination thereof.

Now, a detailed description will be given of an implementation example of the devices illustrated in FIG. 2 with reference to the drawings.

Figure 3:
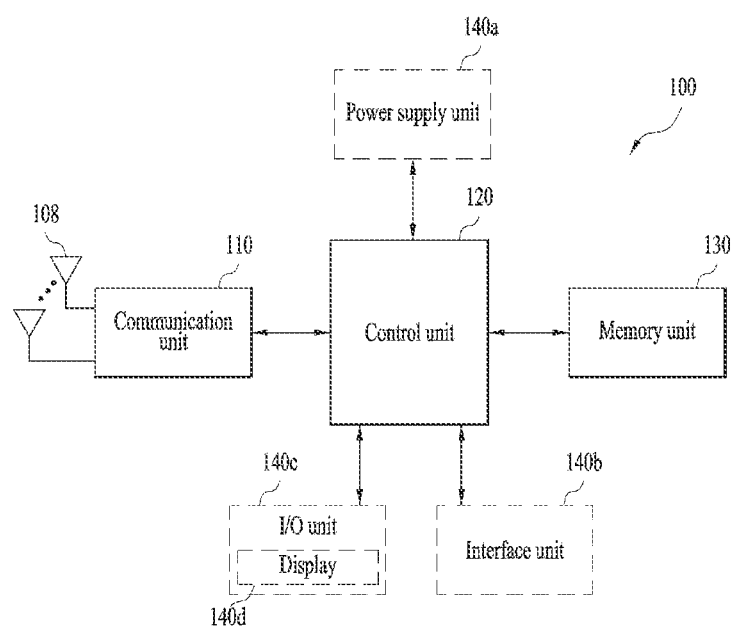

FIG. 3 illustrates a hand-held device applied to the present disclosure. The hand-held device may include a smartphone, a smart pad, a wearable device (e.g., a smart watch or smart glasses), or a portable computer (e.g., a laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 3, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 2, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, and so on. The interface unit 140*b* may support connection between the hand-held device 100 and other external devices. The interface unit 140*b* may include various ports (e.g., an audio I/O port and a video I/O port) for connection to external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by the user and the acquired information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals to original information/signals. The restored information/signals may be stored in the memory unit 130 and output as various types (e.g., text, voice, images, video, or haptic) through the I/O unit 140*c*.

Figure 4:
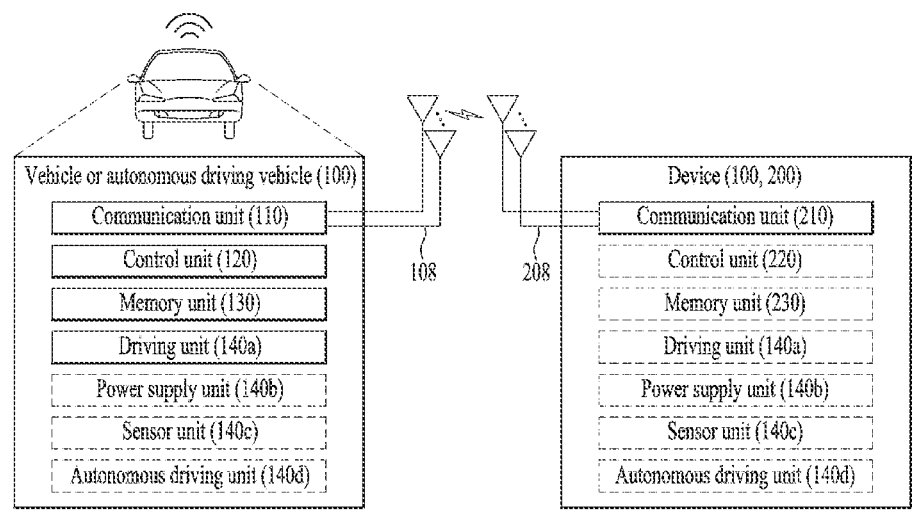

FIG. 4 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 4, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 2, respectively.

The communication unit 110 may transmit and receive signals (e.g., data and control signals) to and from external devices such as other vehicles, BSs (e.g., gNBs and road side units), and servers. The control unit 120 may perform various operations by controlling components of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information a vehicle state, ambient environment information, user information, and so on. The sensor unit 140c may include an inertial measurement unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on from an external server. The autonomous driving unit 140d may generate an autonomous driving path and a driving plan based on the obtained data. The control unit 120 may control the driving unit 140a to drive the vehicle or the autonomous driving vehicle 100 along the autonomous driving path according to the driving plan (e.g., speed/direction control). In the middle of autonomous driving, the communication unit 110 may aperiodically or periodically acquire the latest traffic information data from the external server and acquire surrounding traffic information data from neighboring vehicles. In the middle of autonomous driving, the sensor unit 140c may obtain information about a vehicle state and/or surrounding environment information. The autonomous driving unit 140d may update the autonomous driving path and the driving plan based on the newly obtained data/information. The communication unit 110 may transfer information about a vehicle position, the autonomous driving path, and the driving plan to the external server. The external server may predict traffic information data using AI technology based on the information collected from vehicles or autonomous driving vehicles, and provide the predicted traffic information data to the vehicles or the autonomous driving vehicles.

Figure 5:
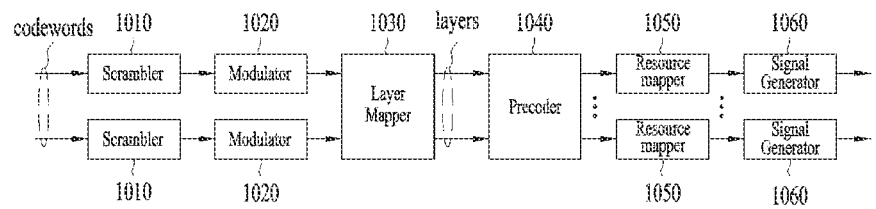
FIG. 5 illustrates an exemplary signal processing circuit to which embodiments of the present disclosure are applied.

FIG. 5 illustrates a signal processing circuit for a transmission signal.

Referring to FIG. 5, a signal processing circuit 1000 may include scramblers 1010, modulators 1020, a layer mapper 1030, a precoder 1040, resource mappers 1050, and signal generators 1060. An operation/function of FIG. 5 may be performed by, but not limited to, the processors 102 and 202 and/or the transceivers 106 and 206 of FIG. 1. Hardware elements of FIG. 5 may be implemented by the processors 102 and 202 and/or the transceivers 106 and 206 of FIG. 1. For example, the blocks 1010 to 1060 may be implemented by the processors 102 and 202 of FIG. 1. Alternatively, the blocks 1010 to 1050 may be implemented by the processors 102 and 202 of FIG. 1 and the block 1060 may be implemented by the transceivers 106 and 206 of FIG. 1.

Codewords may be converted into radio signals through the signal processing circuit 1000 of FIG. 5. The codewords are coded bit sequences of information blocks. The information blocks may include TBs (e.g., UL-SCH TBs or DL-SCH TBs). The radio signals may be transmitted on various physical channels (e.g., a PUSCH or a PDSCH).

Specifically, the codewords may be converted into scrambled bit sequences by the scramblers 1010. Scramble sequences used for scrambling may be generated based on an initialization value, and the initialization value may include ID information about a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. N is the number of antenna ports, and M is the number of transport layers. The precoder 1040 may perform precoding after transform precoding (e.g., DFT) for complex modulation symbols. Alternatively, the precoder 1040 may perform precoding without transform precoding.

The resource mappers 1050 may map modulation symbols of each antenna port to time-frequency resources. The time-frequency resources may include a plurality of symbols (e.g., CP-OFDMA symbols or DFT-s-OFDMA symbols) in the time domain and a plurality of subcarriers in the frequency domain. The signal generators 1060 may generate radio signals from the mapped modulation symbols, and the generated radio signals may be transmitted to other devices through each antenna. For this purpose, the signal generators 1060 may include inverse fast Fourier transform (IFFT) modules, CP inserters, digital-to-analog converters (DACs), and frequency upconverters.

Signal processing procedures for a signal received in the wireless device may be configured reversely to the signal processing procedures 1010 to 1060 of FIG. 5. For example, the wireless devices (e.g., 100 and 200 of FIG. 1) may receive radio signals from the outside through the antenna ports/transceivers. The received radio signals may be converted into baseband signals through signal restorers. To this end, the signal restorers may include frequency downconverters, analog-to-digital converters (ADCs), CP remover, and FFT modules. Subsequently, the baseband signals may be restored to codewords by resource demapping, postcoding, demodulation, and descrambling. The codewords may be decoded to original information blocks. Therefore, the signal processing circuit (not shown) for a received signal may include signal restorers, resource demappers, a postcoder, demodulators, descramblers, and decoders.

Figure 6:
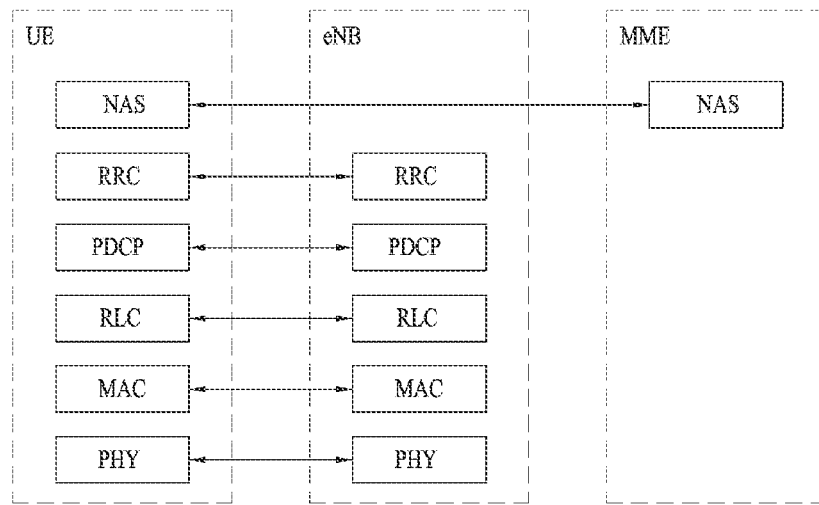
FIG. 6 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 6:
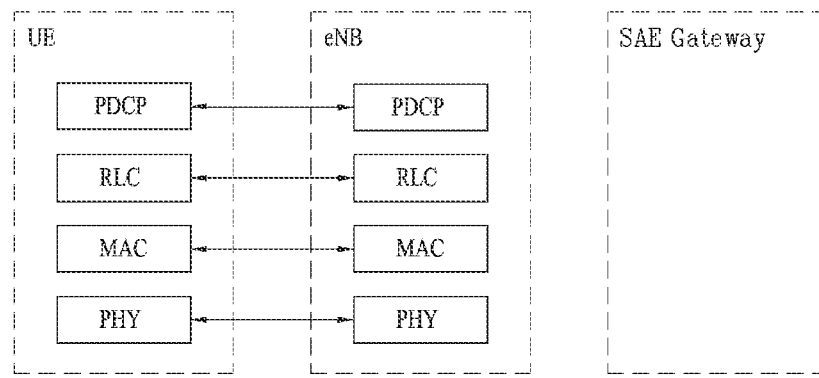

FIG. 6 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 7:
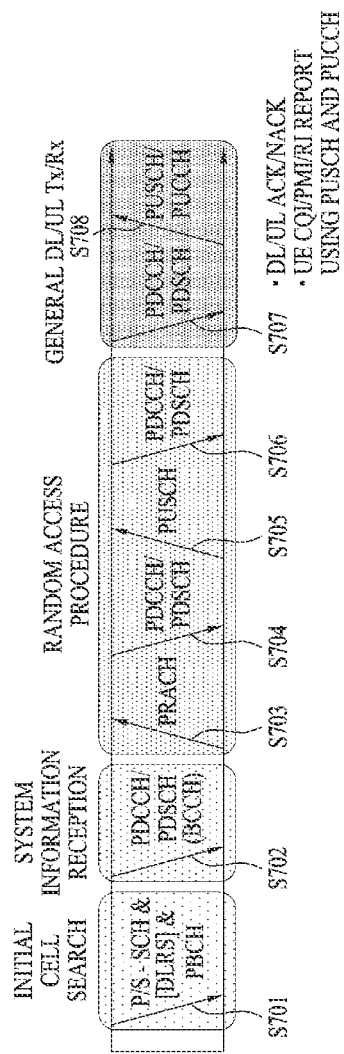
FIG. 7 is a view illustrating physical channels and a general signal transmission method using the physical channels in a 3GPP system.

FIG. 7 illustrates physical channels and a general method for transmitting signals on the physical channels in the 3GPP system.

Referring to FIG. 7, when a UE is powered on or enters a new cell, the UE performs initial cell search (S701). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S702).

If the UE initially accesses the eNB or has no radio resources for signal transmission to the eNB, the UE may perform a random access procedure with the eNB (S703 to S706). In the random access procedure, the UE may transmit a predetermined sequence as a preamble on a physical random access channel (PRACH) (S703 and S705) and may receive a response message to the preamble on a PDCCH and a PDSCH associated with the PDCCH (S704 and S706). In the case of a contention-based RACH, the UE may additionally perform a contention resolution procedure.

After the above procedure, the UE may receive a PDCCH and/or a PDSCH from the eNB (S707) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

An NR system considers a method using an ultra-high frequency band, i.e., a millimeter frequency band of 6 GHz or above, to transmit data to multiple users using a wide frequency band while maintaining a high transmission rate. In 3GPP, this is used by the name of NR and, in the present disclosure, this will be hereinafter referred to as the NR system.

NR supports a plurality of numerologies (or subcarrier spacings (SCSs)) to support various 5G services. For example, when an SCS is 15 kHz, a wide area in traditional cellular bands is supported. When the SCS is 30 kHz/60 kHz, a dense-urban, lower latency, and wider carrier bandwidth are supported. When the SCS is 60 kHz or higher, bandwidth greater than 24.25 kHz is supported in order to overcome phase noise.

An NR frequency band may be defined as two types (FR1 and FR2) of frequency ranges. FR1 may refer to "sub-6 GHz range", and FR2 may refer to "above 6 GHz range" and may be referred to as a millimeter wave (mmW).

Table 1 below shows the definition of am NR frequency band.

TABLE 1

| Frequency Range Designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

DL Channel Structures

A BS transmits related signals on later-described DL channels to a UE, and the UE receives the related signals on the DL channels from the BS.

(1) Physical Downlink Shared Channel (PDSCH)

The PDSCH delivers DL data (e.g., a DL-SCH TB) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

Figure 8:
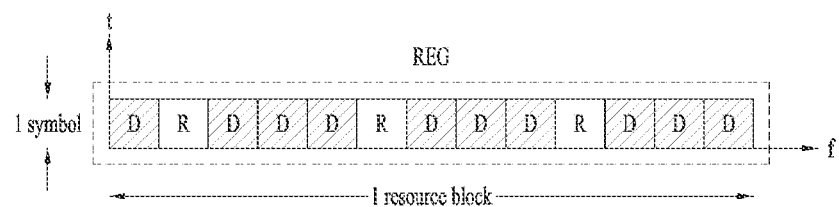
FIGS. 8 to 10 are diagrams for explaining a downlink control channel (physical downlink control channel; PDCCH) in a new radio access technology (new RAT or NR) system.
Figure 15:
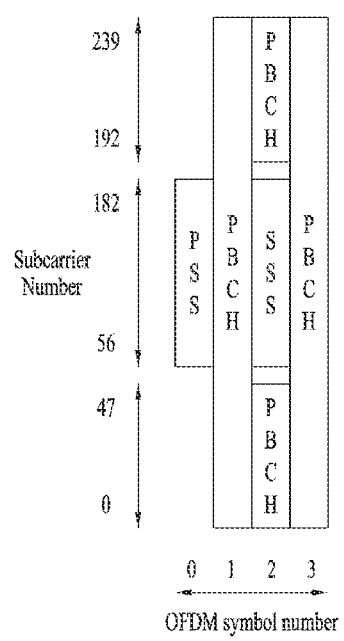
FIGS. 15 to 20 are diagrams for explaining the composition of a synchronization signal/physical broadcast channel (SS/PBCH) block and a method of transmitting the SS/PBCH block.

FIG. 8 illustrates an exemplary structure of one REG. In FIG. 15, D represents an RE to which DCI is mapped, and R represents an RE to which a DMRS is mapped. The DMRS is mapped to RE #1, RE #5, and RE #9 along the frequency direction in one symbol.

The PDCCH is transmitted in a CORESET. A CORESET is defined as a set of REGs with a given numerology (e.g., an SCS, a CP length, or the like). A plurality of CORESETs for one UE may overlap with each other in the time/frequency domain. A CORESET may be configured by system information (e.g., an MIB) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 9:
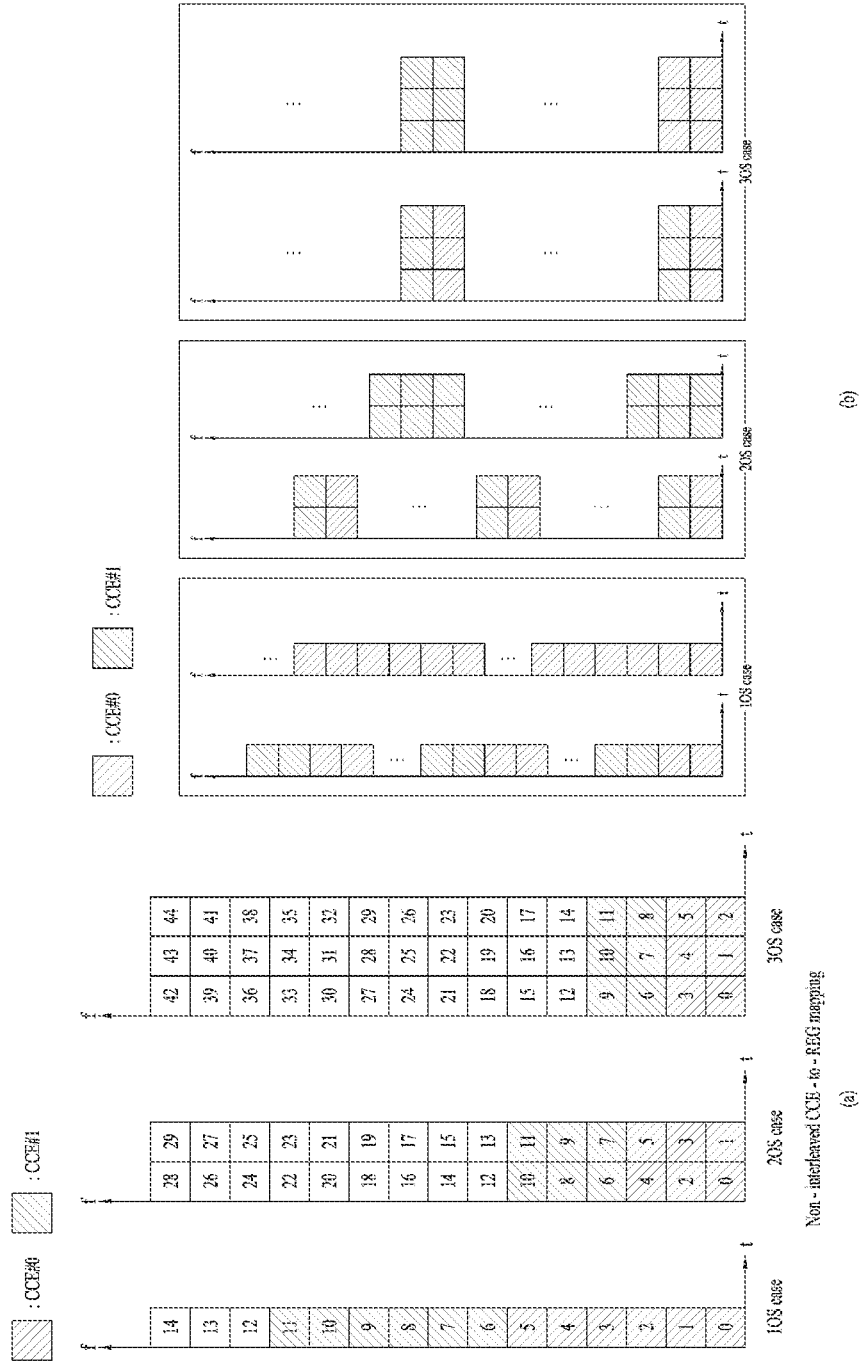

CCE-to-REG mapping for the CORESET may be an interleaved type or a non-interleaved type. FIG. 9(a) is a diagram illustrating non-interleaved CCE-REG mapping, and FIG. 9(b) is a diagram illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 10:
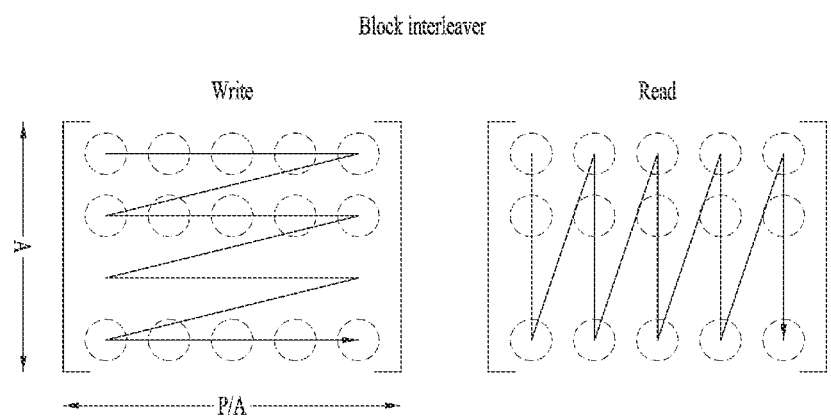
Figure 17:
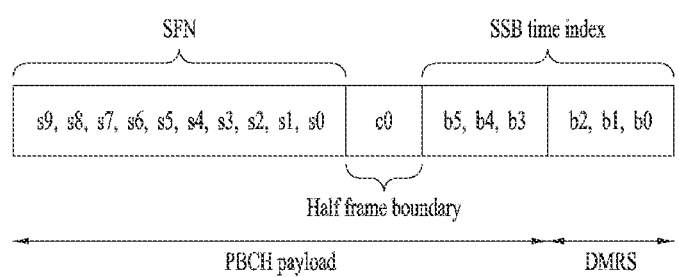

FIG. 10 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 17. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 2 lists features of the respective search space types.

TABLE 2

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg 2, Msg 4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 3 lists exemplary DCI formats transmitted on the PDCCH.

TABLE 3

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Discontinuous Reception (DRX) Operation

The UE may perform DRX operation while executing the above-described/proposed procedures and/or methods. When the UE is configured with DRX, the UE may reduce power consumption by receiving DL signals discontinuously. DRX may be performed in RRC_IDLE, RRC_INACTIVE, and RRC_CONNECTED states. In the RRC_IDLE and RRC_INACTIVE states, DRX may be used to receive paging signals discontinuously. Hereinafter, DRX performed in the RRC_CONNECTED state will be described (RRC_CONNECTED DRX).

Figure 11:
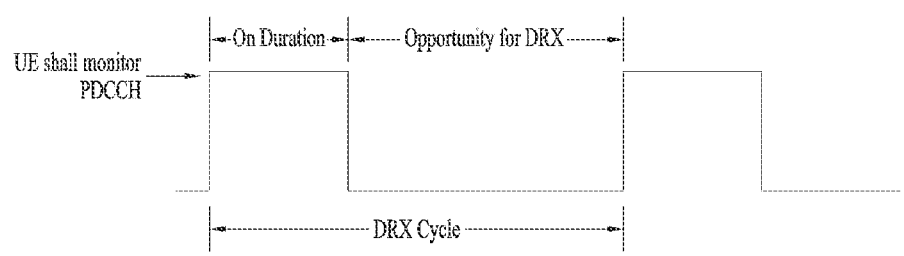
FIG. 11 is a diagram for explaining an example of discontinuous reception (DRX) operation.

FIG. 11 illustrates a DRX cycle (RRC_CONNECTED state).

Referring to FIG. 11, a DRX cycle includes an ON duration and an opportunity for DRX. The DRX cycle defines a time interval in which the ON duration is periodically repeated. The ON duration is a time period during which the UE performs monitoring to receive a PDCCH. When DRX is configured, the UE performs PDCCH monitoring during the ON duration. If the UE successfully detects any PDCCH during the PDCCH monitoring, the UE starts an inactivity timer and maintains an awake state. On the other hand, if the UE detects no PDCCH during the PDCCH monitoring, the UE enters a sleep state after expiration of the ON duration. Therefore, when DRX is configured, PDCCH monitoring/reception may be performed discontinuously in the time domain while the afore-described/proposed procedures and/or methods are performed. For example, when DRX is configured, PDCCH reception occasions (e.g., slots including a PDCCH search space) may be configured to be discontinuous according to DRX configurations. On the contrary, when no DRX is configured, PDCCH monitoring/reception may be performed continuously in the time domain. For example, when no DRX is configured, PDCCH reception occasions (e.g., slots including a PDCCH search space) may be configured to be continuous. The PDCCH monitoring may not be allowed in a time period corresponding to a measurement gap, regardless of whether DRX is configured.

Table 4 shows UE procedures related to DRX (in the RRC_CONNECTED state). Referring to Table 4, DRX configuration information may be received by higher layer (RRC) signaling, and DRX ON/OFF may be controlled by a DRX command of the MAC layer. Once DRX is configured, the UE may perform the PDCCH monitoring discontinuously while executing the procedures and/or methods described/proposed as shown in FIG. 11.

TABLE 4

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information for the definition of DRX.
—Value of drx-OnDurationTimer: defines the duration at the beginning of a DRX cycle.
  Value of drx-InactivityTimer: defines the duration in which the UE is in the awake state after a PDCCH occasion in which a PDCCH indicating initial UL or DL data is detected.
  Value of drx-HARQ-RTT-TimerDL: defines the maximum duration until DL retransmission is received after reception of initial DL transmission.
  Value of drx-HARQ-RTT-TimerDL: defines the maximum duration until a grant for UL retransmission is received after reception of a grant for initial UL transmission.
  drx-LongCycleStartOffset: defines the duration and starting time of a DRX cycle.
  drx-ShortCycle (optional): defines the duration of a short DRX cycle.

When any one of drx-OnDurationTimer, drx-InactivityTimer, drx-HARQ-RTT-TimerDL, and drx-HARQ-RTT-TimerDL is running, the UE performs the PDCCH monitoring in each PDCCH occasion while maintaining the awake state.

Random Access (or RACH) Procedure

Figure 12:
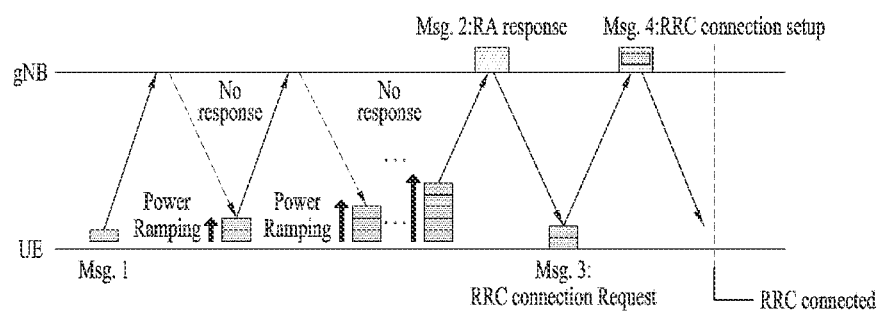
FIG. 12 is a diagram illustrating an exemplary random access procedure.

FIG. 12 illustrates an exemplary random access procedure. In particular, FIG. 12 illustrates a contention-based random access procedure.

First, the UE may transmit a RACH preamble as Msg 1 on a PRACH in a RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 KHz.

Multiple preamble formats are defined by one or more RACH OFDM symbols and different CPs (and/or guard times). A RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits a RACH preamble in RACH time-frequency resources associated with a detected or selected SSB.

An SSB threshold for RACH resource association may be configured by the network, and a RACH preamble is transmitted or retransmitted based on an SSB having a reference signal received power (RSRP) measurement satisfying the threshold. For example, the UE may select one of SSBs satisfying the threshold, and transmit or retransmit a RACH preamble in RACH resources associated with the selected SSB.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information includes timing advance information for UL synchronization, a UL grant, and a UE temporary ID. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

Meanwhile, the contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives an RAR from the BS, the RACH procedure is completed.

As described before, the UL grant included in the RAR schedules a PUSCH transmission for the UE. A PUSCH carrying an initial UL transmission based on the UL grant of the RAR is referred to as an Msg 3 PUSCH. The contents of the RAR UL grant start from the MSB and ends in the LSB, given as Table 5.

TABLE 5

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The transmit power control (TPC) command is used to determine the transmission power of the Msg 3 PUSCH. For example, the TPC command is interpreted according to Table 6.

TABLE 6

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB1.

Unlicensed Band

Figure 13:
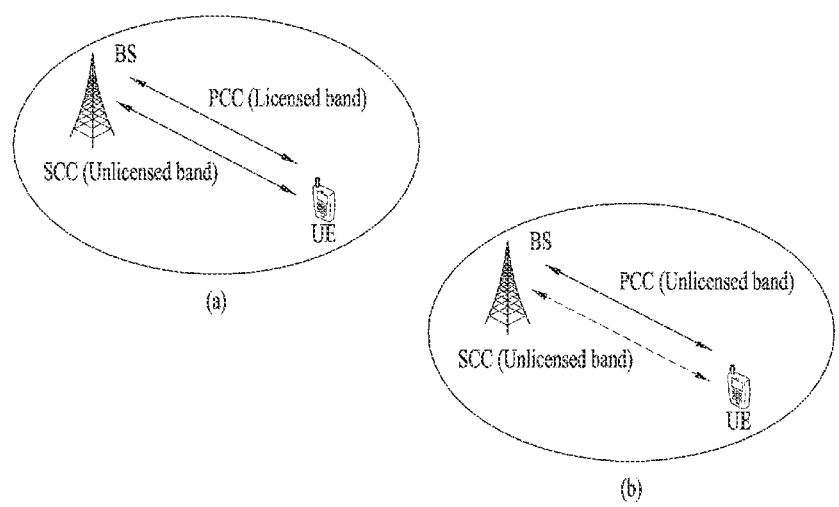
FIGS. 13 and 14 are diagrams for explaining downlink channel transmission in an unlicensed band.

FIG. 13 illustrates a wireless communication system supporting an unlicensed band applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 13(a), the LCC and the UCC may be set to a primary CC (PCC) and a secondary CC (SCC), respectively. The BS and the UE may transmit and receive signals on one UCC or on a plurality of UCCs where carrier aggregation is applied as shown in FIG. 13(b). In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

Figure 21:
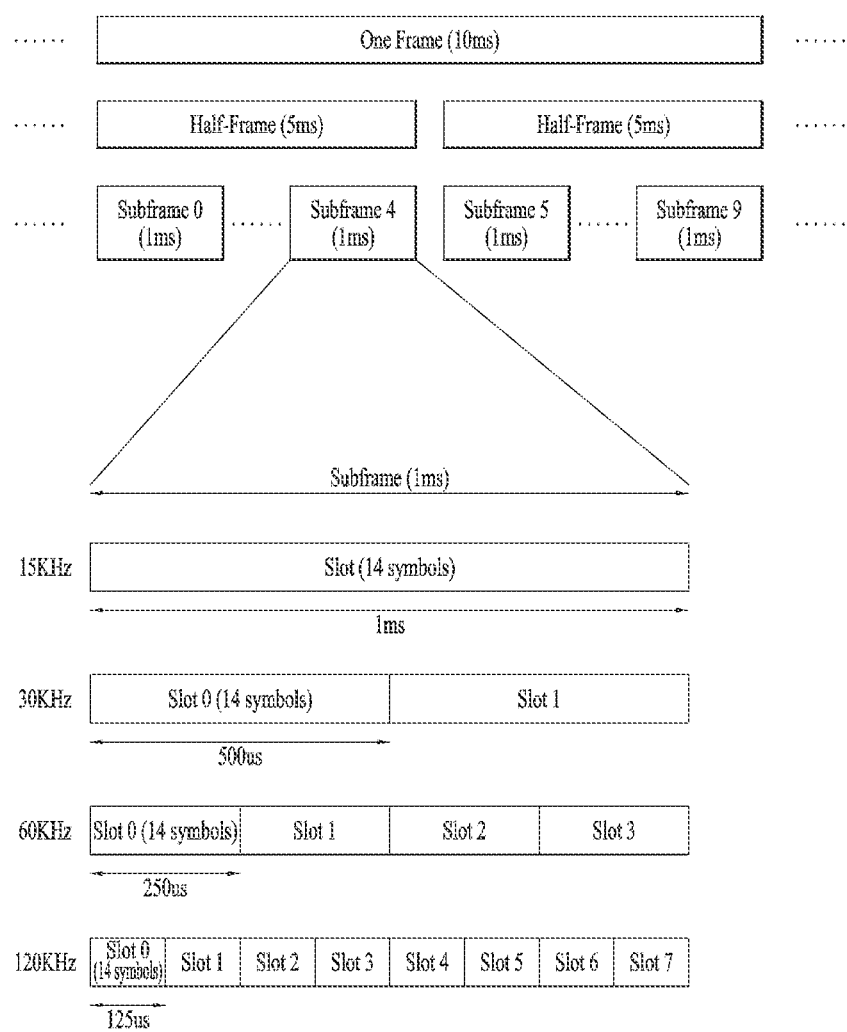
FIGS. 21 to 23 are views illustrating structures of a radio frame and slots used in a new RAT (NR) system.

The NR frame structure shown in FIG. 21 may be used for U-band operations. The configuration of OFDM symbols reserved for UL/DL signal transmission in a U-band frame structure may be determined by the BS. In this case, the OFDM symbol may be replaced with an SC-FDM(A) symbol.

For DL signal transmission in U-bands, the BS may inform the UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of reserved OFDM symbols in subframe #n based on a specific filed in DCI (e.g., 'subframe configuration for LAA' field, etc.), which is received in subframe #n−1 or subframe #n from the BS.

Table 7 shows how the 'subframe configuration for LAA' field indicates the configuration of OFDM symbols used to transmit DL physical channels and/or physical signals in the current and/or next subframe.

TABLE 7

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For UL signal transmission in U-bands, the BS may provide information on a UL transmission period to the UE through signaling.

Specifically, in the LTE system supporting U-bands, the UE may obtain 'UL duration' and 'UL offset' information on subframe fin from the 'UL duration and offset' field in detected DCI.

Table 8 shows how the 'UL duration and offset' field indicates the configurations of a UL offset and a UL duration.

TABLE 8

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |

TABLE 8-continued

| Value of 'UL duration and offset' field | UL offset, l (in subframes) | UL duration, d (in subframes) |
| --- | --- | --- |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the 'UL duration and offset' field configures (or indicates) UL offset l and UL duration d for subframe #n, the UE may not need to receive DL physical channels and/or physical signals in subframe #n+l+i (where i=0, 1, . . . , d−1).

To transmit a DL signal in a U-band, the BS may perform a DL channel access procedures (e.g., channel access procedure (CAP)) for the U-band as follows.

(1) First DL CAP Method

Figure 14:
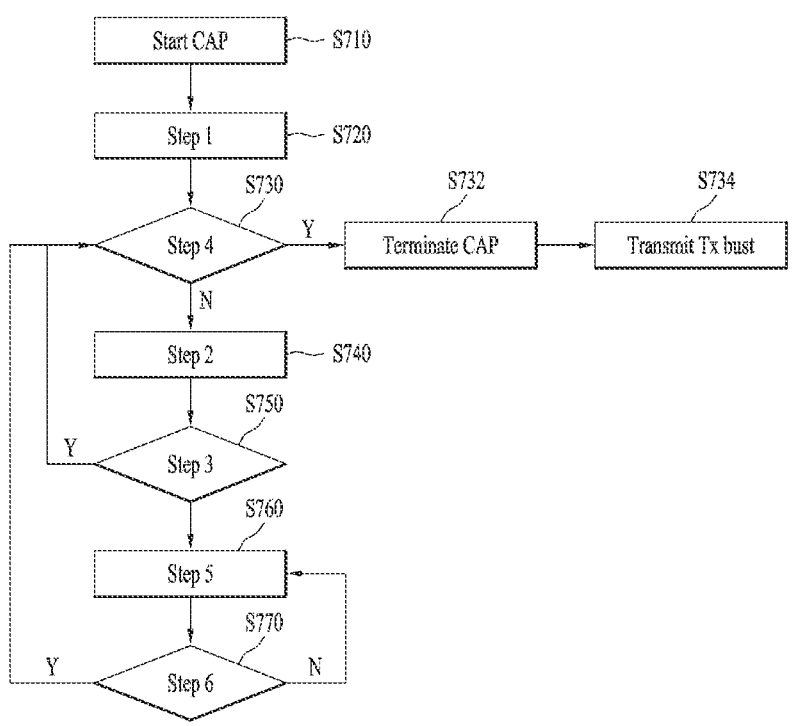

FIG. 14 is a flowchart illustrating CAP operations performed by a BS to transmit a DL signal in a U-band.

The BS may initiate a CAP for DL signal transmission (including a PDSCH/PDCCH/EPDCCH) in the U-band (S1410). The BS may randomly select a backoff counter N within a contention window (CW) according to step 1. N is set to an initial value $N_{init}$ (S1420). $N_{init}$ is a random value selected between 0 and $CW_p$. Subsequently, when the backoff counter value N is 0 according to step 4 (S1430; Y), the BS terminates the CAP (S1432). The BS may then perform Tx burst transmission including the PDSCH/PDCCH/EPDCCH (S1434). On the contrary, when the backoff counter value N is not 0 (S1430; N), the BS decreases the backoff counter value by 1 according to step 2 (S1440). Subsequently, the BS checks whether the channel of U-cell(s) is idle (S1450). If the channel is idle (S1450; Y), the BS determines whether the backoff counter value is 0 (S1430). On the contrary, when the channel is not idle, that is, the channel is busy in step S1450 (S1450; N), the BS determines whether the channel is idle for a defer duration $T_d$ (longer than or equal to 25 usec), which is longer than a slot duration (e.g., 9 usec), according to step 5 (S1460). If the channel is idle for the defer duration (S1470; Y), the BS may resume the CAP. Here, the defer duration may include a duration of 16 usec and $m_p$ consecutive slot durations (e.g., 9 usec), which immediately follows the duration of 16 usec. If the channel is busy for the defer duration (S1470; N), the BS performs steps S1460 again to check whether the channel of U-cell(s) is idle for a new defer duration.

Table 9 shows that the values of $m_p$, a minimum CW, a maximum CW, a maximum channel occupancy time (MCOT), and allowed CW sizes, which are applied to the CAP, vary depending on channel access priority classes.

TABLE 9

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The size of a CW applied to the first DL CAP may be determined in various ways. For example, the size of the CW may be adjusted based on a probability that HARQ-ACK values for PDSCH transmission(s) within a predetermined period of time (e.g., reference TU) are determined as NACK. When the BS performs the DL signal transmission on a carrier including a PDSCH associated with the channel access priority class P, if a probability that HARQ-ACK values for PDSCH transmission(s) in reference subframe k (or reference slot k) are determined as NACK is at least Z=80%, the BS increases a CW value configured for each priority class to a next allowed value. Alternatively, the BS maintains the CW value configured for each priority class as an initial value. The reference subframe (or reference slot) may be defined as a starting subframe (or starting slot) where transmission is performed most recently on the corresponding carrier where at least part of HARQ-ACK feedback is available.

(2) Second DL CAP Method

The BS may perform DL signal transmission in a U-band based on the following second DL CAP method (here, the DL signal transmission includes a discovery signal but includes no PDSCH).

When the duration of the signal transmission of the BS is less than or equal to 1 ms, the BS may transmit a DL signal (e.g., a signal including a discovery signal with no PDSCH) in the U-band immediately after sensing that a corresponding channel is idle at least for a sensing duration of $T_{drs}$=25 us. Here, $T_{drs}$ includes a duration $T_f$ of 16 us immediately followed by one slot duration $T_{sl}$ of 9 us.

(3) Third DL CAP Method

To perform DL signal transmission on multiple carriers in a U-band, the BS may perform the CAP as follows.

1) Type A: The BS may perform the CAP for the multiple carriers based on a counter defined for each carrier N (i.e., counter N considered for the CAP) and perform the DL signal transmission based thereon.

Type A1: The counter for each carrier N is determined independently, and the DL signal transmission on the multiple carriers is performed based on the counter for each carrier N.

Type A2: The counter for each carrier N is determined as the value of N for a carrier with the largest CW size, and the DL signal transmission on the multiple carriers is performed based on the counter for each carrier N.

2) Type B: The BS performs the CAP for a specific carrier among the multiple carriers based on the counter N. Before transmitting a signal on the specific carrier, the BS determines whether the channel is idle on the remaining carriers. Then, the BS performs the DL signal transmission.

Type B1: A single CW size is defined for the multiple carriers. When performing the CAP for the specific carrier based on the counter N, the BS uses the single CW size.

Type B2: A CW is defined for each carrier. When determining the value of $N_{init}$ for the specific carrier, the BS uses the largest CW size among CW sizes.

FIG. 15 illustrates an SSB structure. The UE may perform cell search, system information acquisition, beam alignment for initial access, DL measurement, etc. based on the SSB. The SSB and synchronization signal/physical broadcast channel (SS/PBCH) block are interchangeably used.

Referring to FIG. 15, an SSB includes a PSS, an SSS, and a PBCH. The SSB is configured over four consecutive OFDM symbols, and the PSS, PBCH, SSS/PBCH, and PBCH are transmitted on the respective OFDM symbols. The PSS and SSS may each consist of 1 OFDM symbol and 127 subcarriers, and the PBCH may consist of 3 OFDM symbols and 576 subcarriers. Polar coding and quadrature phase shift keying (QPSK) are applied to the PBCH. The PBCH may have a data RE and a demodulation reference signal (DMRS) RE for each OFDM symbol. There may be three DMRS REs for each RB, and there may be three data REs between DMRS REs.

Cell Search

The cell search refers to a procedure in which the UE acquires time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 10 below.

TABLE 10

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

Figure 16:
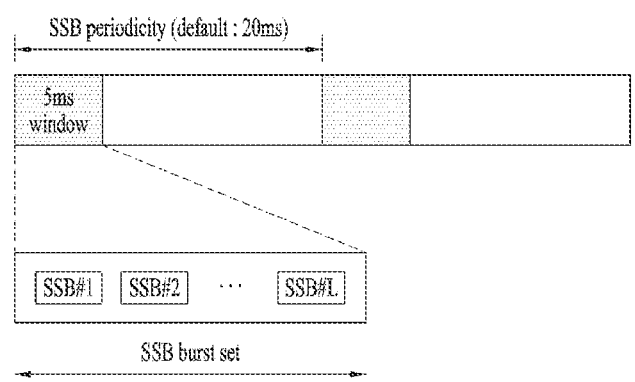

FIG. 16 illustrates SSB transmission.

The SSB is periodically transmitted in accordance with the SSB periodicity. The basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). A SSB burst set may be configured at the beginning of the SSB periodicity. The SSB burst set may be configured with a 5 ms time window (i.e., half-frame), and the SSB may be repeatedly transmitted up to L times within the SS burst set. The maximum number of transmissions of the SSB, L, may be given according to the frequency band of the carrier wave as follows. One slot includes up to two SSBs.

For frequency range up to 3 GHZ, L=4
For frequency range from 3 GHz to 6 GHZ, L=8
For frequency range from 6 GHz to 52.6 GHz, L=64

The time position of an SSB candidate in the SS burst set may be defined according to the SCS as follows. The time position of the SSB candidate is indexed from 0 to L−1 in temporal order within the SSB burst set (i.e., half-frame) (SSB index).

- Case A—15 kHz SCS: The index of the start symbol of a candidate SSB is given as {2, 8}+14*n. When the carrier frequency is lower than or equal to 3 GHZ, n=0, 1. When the carrier frequency is 3 GHz to 6 GHz, n=0, 1, 2, 3.
- Case B—30 kHz SCS: The index of the start symbol of a candidate SSB is given as {4, 8, 16, 20}+28*n. When the carrier frequency is lower than or equal to 3 GHZ, n=0. When the carrier frequency is 3 GHz to 6 GHZ, n=0, 1.
- Case C—30 kHz SCS: The index of the start symbol of a candidate SSB is given as {2, 8}+14*n. When the carrier frequency is lower than or equal to 3 GHz, n=0. When the carrier frequency is 3 GHz to 6 GHz, n=0, 1, 2, 3.
- Case D—120 kHz SCS: The index of the start symbol of a candidate SSB is given as {4, 8, 16, 20}+28*n. When the carrier frequency is higher than 6 GHZ, n=0, 1, 2, 3, 5, 6, 7, 8, 10, 11, 12, 13, 15, 16, 17, 18.
- Case E—240 kHz SCS: The index of the start symbol of a candidate SSB is given as {8, 12, 16, 20, 32, 36, 40, 44}+56*n. When the carrier frequency is higher than 6 GHz, n=0, 1, 2, 3, 5, 6, 7, 8.

FIG. 17 illustrates acquisition of DL time synchronization information at a UE.

The UE may acquire DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may acquire 10-bit SFN system information s0 to s9 from the PBCH. 6 bits out of the 10-bit SFN information is obtained from a master information block (MIB), and the remaining 4 bits are obtained from a PBCH TB.

The UE may then acquire 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may acquire an SSB index based on the DMRS sequence and PBCH payload. SSB candidates are indexed with 0 to L−1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 18:
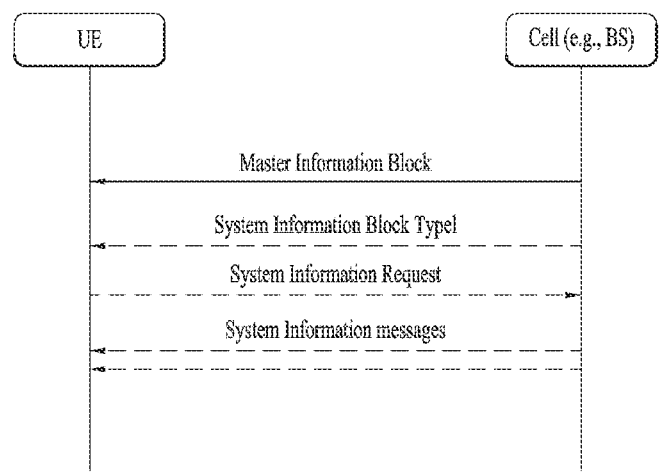

FIG. 18 illustrates a system information (SI) acquisition procedure. The UE may acquire access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to acquire the other SI. SIB1 may also be referred to as remaining minimum system information (RMSI). For details, the following may be referred to.

- The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.
- SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.
- SIBx is included in an SI message and transmitted on a PDSCH. Each SI message is transmitted within a periodic time window (i.e., SI-window).

Beam Alignment

Figure 19:
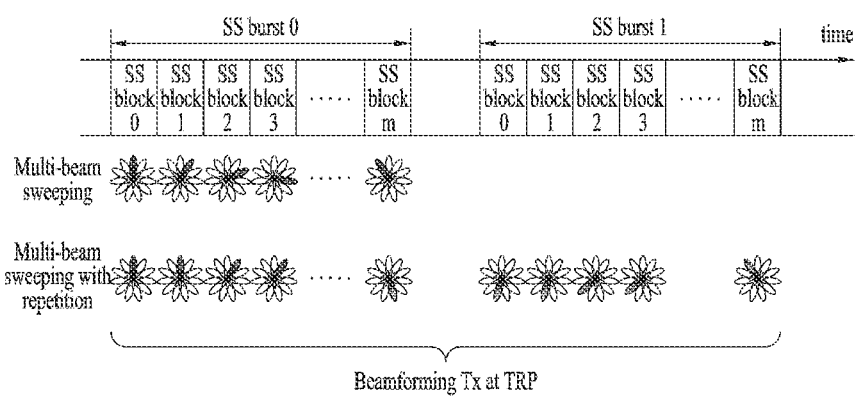

FIG. 19 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHZ, maximum number of beams=4

For frequency range from 3 GHz to 6 GHz, maximum number of beams=8

For frequency range from 6 GHz to 52.6 GHZ, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit a RACH preamble in PRACH resources linked/corresponding to the index (i.e., beam) of the best SSB. The SSB may also be used for beam alignment between the BS and the UE even after the initial access.

Channel Measurement and Rate Matching

Figure 20:
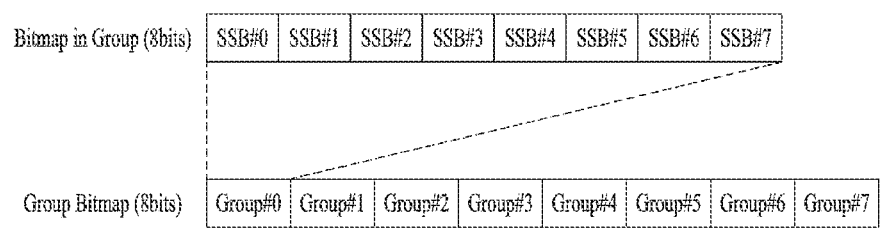

FIG. 20 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

- If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 13. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.
- If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

FIG. 21 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 11 illustrates that the number of symbols per slot, the number of slots per frame, and the number of slots per subframe vary according to the SCS when the normal CP is used.

TABLE 11

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe $N^{slot}_{symb}$: Number of symbols in a slot
$N^{frame,u}_{slot}$: Number of slots in a frame
$N^{subframe,u}_{slot}$: Number of slots in a subframe Table 12 illustrates that the number of symbols per slot, the number of slots per frame, and the number of slots per subframe vary according to the SCS when the extended CP is used.

TABLE 12

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 22:
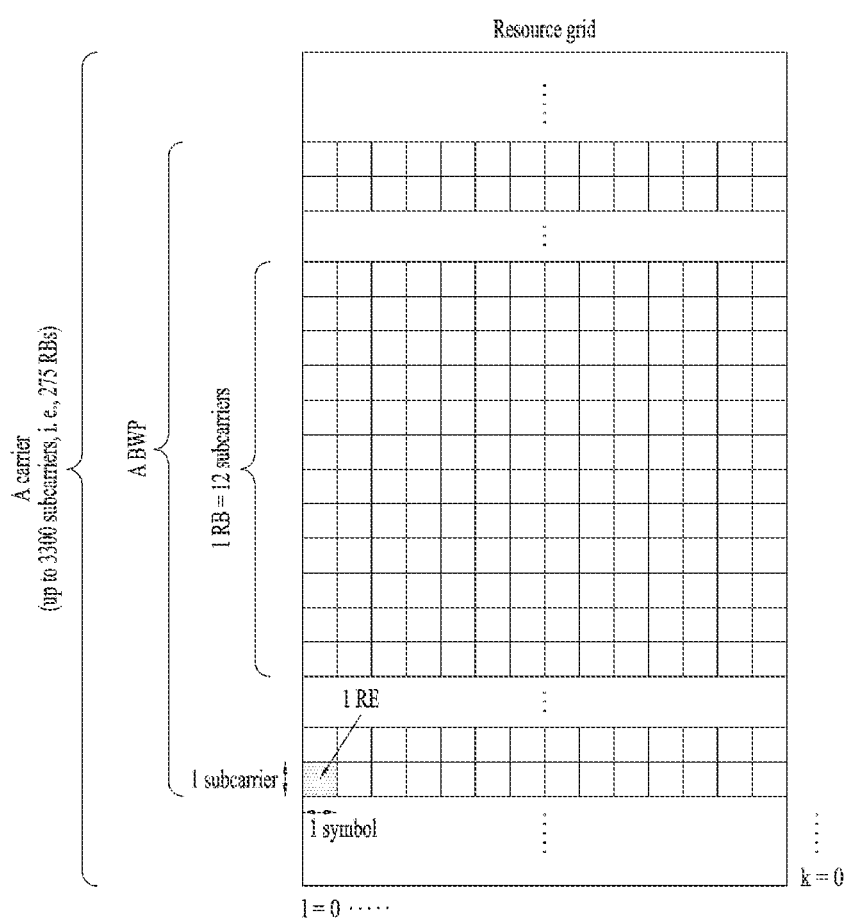

FIG. 22 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 23:
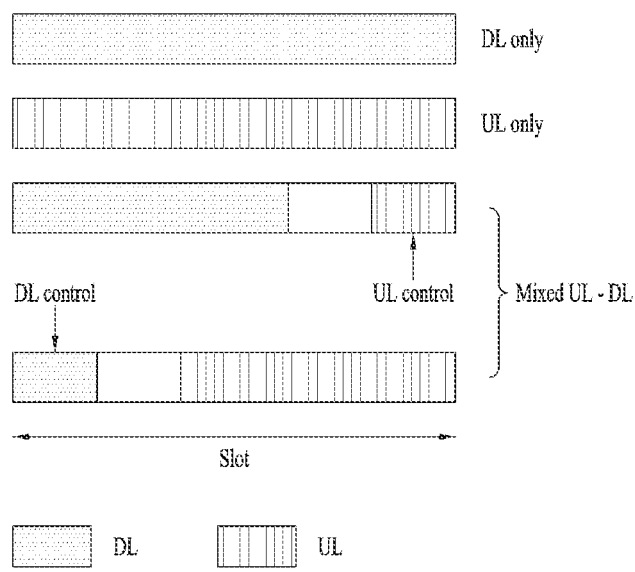

FIG. 23 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Bandwidth Part (BWP)

In the NR system, up to 400 MHz per carrier may be supported. When a UE operating in such a wideband carrier always operates with a radio frequency (RF) module for the entire carrier turned on, battery consumption of the UE may increase. Alternatively, considering various use cases (e.g., eMBB, URLLC, mMTC, and so on) operating within a single wideband carrier, a different numerology (e.g., SCS) may be supported for each frequency band within the carrier. Alternatively, each UE may have a different maximum bandwidth capability. In this regard, the BS may indicate to the UE to operate only in a partial bandwidth instead of the total bandwidth of the wideband carrier. The partial bandwidth may be defined as a BWP. A BWP is a subset of contiguous common RBs defined for numerology ui in BWP i on the carrier, and one numerology (e.g., SCS, CP length, or slot or mini-slot duration) may be configured for the BWP.

The BS may configure one or more BWPs in one carrier configured for the UE. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells. That is, the BS may configure at least one DL/UL BWP for a UE associated with the wideband carrier, activate at least one of DL/UL BWP(s) configured at a specific time point (by L1 signaling being a physical-layer control signal, a MAC control element (CE) being a MAC-layer control signal, or RRC signaling), or set a timer value and switch the UE to a predetermined DL/UL BWP, upon expiration of the timer. To indicate switching to another configured DL/UL BWP, DCI format 1_1 or DCI format 0_1 may be used. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

A DL BWP is a BWP in which a DL signal such as a PDCCH and/or a PDSCH is transmitted and received, whereas a UL BWP is a BWP in which a UL signal such as a PUCCH and/or a PUSCH is transmitted and received.

In the NR system, a DL channel and/or a DL signal may be transmitted and received in an active DL BWP. Further, a UL channel and/or a UL signal may be transmitted and received in an active UL BWP.

Before a detailed description, implementation examples of operations of a UE and a BS according to an embodiment of the present disclosure will be described below with reference to FIGS. 24 and 25.

Figure 24:
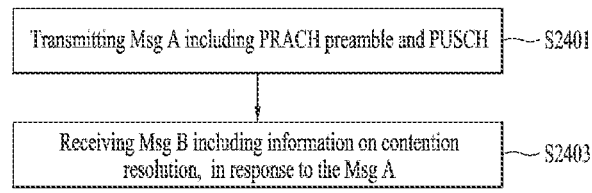
FIGS. 24 to 25 are diagrams for explaining exemplary operations of a UE and a base station (BS) according to embodiments of the present disclosure.

FIG. 24 is a diagram illustrating an implementation example of an operation of a UE according to the present disclosure. Referring to FIG. 18, the UE may transmit a PRACH and PUSCH in Msg A (S2401). The UE may then receive Msg B related to contention resolution in response to Msg A (S2403). A specific method of performing a RACH procedure by the UE in steps S2401 and S2403 may be based on the later-described embodiments and features.

The UE illustrated in FIG. 24 may be one of various wireless devices illustrated in FIGS. 1 to 4. For example, the UE of FIG. 24 may be a first wireless device 100 illustrated in FIG. 1 or a wireless device 100 or 200 illustrated in FIG. 2. In other words, the operation of FIG. 24 may be performed by one of the various wireless devices illustrated in FIGS. 1 to 4.

Figure 25:
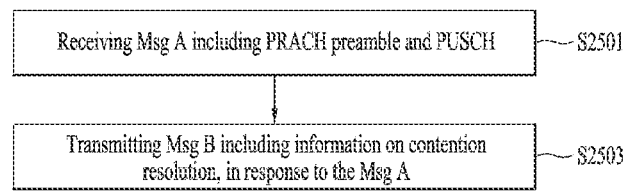

FIG. 25 is a diagram illustrating an implementation example of an operation of a BS according to the present disclosure. Referring to FIG. 19, the BS may receive a PRACH and PUSCH in Msg A (S2501). The BS may then transmit Msg B related to contention resolution in response to Msg A (S2503). A specific method of performing a RACH procedure by the BS in steps S2501 and S2503 may be based on the later-described embodiments and features.

The BS illustrated in FIG. 25 may be one of various wireless devices illustrated in FIGS. 1 to 4. For example, the BS of FIG. 25 may be a second wireless device 200 illustrated in FIG. 1 or the wireless device 100 or 200 illustrated in FIG. 2. In other words, the operation of FIG. 25 may be performed by one of the various wireless devices illustrated in FIGS. 1 to 4.

Unlike legacy LTE and NR Rel-15 in which the RACH procedure is performed in four steps, a 2-step RACH procedure is introduced in NR Rel-16 to reduce the latency in the RACH procedure of the UE. In the newly introduced 2-step RACH procedure, transmission of Message 3 (Msg 3) including a PUSCH and transmission of Message 4 (Msg 4) including a contention resolution message, etc. of the legacy 4-step RACH procedure are omitted. Instead, in the first step of the RACH procedure performed by the UE, the UE may transmit Message A (Msg A) including a random access preamble (or PRACH preamble) and a PUSCH to the BS to provide not only the random access preamble but also the PUSCH. Upon receiving Msg A, the BS may transmit to the UE Message B (Msg B) including a random access response (RAR), a contention resolution message, and timing advance (TA) information in response to Msg A. Upon receiving Msg B, the UE decodes Msg B, completes the RACH procedure, and then performs data transmission/reception.

Figure 26:
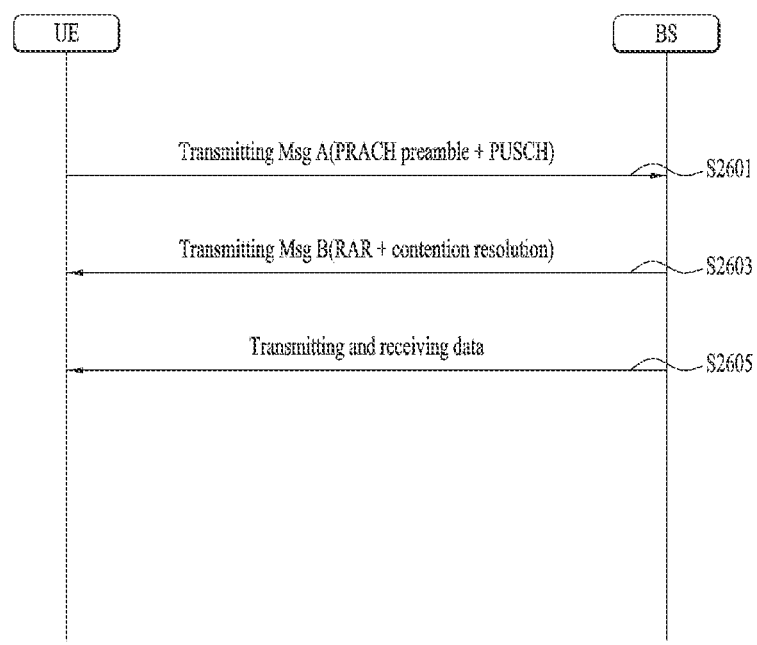
FIG. 26 is a diagram illustrating a basic 2-step random access channel (RACH) procedure.

FIG. 26 is a diagram illustrating a basic 2-step RACH procedure. Referring to FIG. 26, the UE transmits Msg A including a RACH preamble (or PRACH preamble) and a PUSCH to perform the RACH procedure for the BS (S2601). Upon receiving Msg A, the BS transmits Msg B including an RAR and contention resolution information in response to Msg A (S2603). If the UE successfully receives Msg B, the UE completes the access to the BS and may transmit/receive data to/from the BS (S2605).

In the 2-step RACH procedure, if the BS successfully receives Msg A including the PRACH preamble and PUSCH, the BS transmits Msg B to the UE as described above. In this case, the UE monitors a PDCCH for Msg B for a predetermined period of time based on a specific radio network temporary identifier (RNTI).

On the other hand, if the BS fails to receive Msg A, the BS does not transmit any response signal to the UE or instructs the UE to switch (fall back) to the 4-step RACH procedure. If the BS sends no response signal to the UE, the UE monitors a response signal from the BS such as Msg B or a signal such as the PDCCH for Msg B. If the UE detects no signals for a certain period of time, the UE may start a process for retransmitting Msg A. When the BS transmits a signal instructing the UE to fall back to the 4-step RACH procedure, the UE may stop monitoring Msg B and then start the 4-step RACH procedure after the UE is instructed to fall back to the 4-step RACH procedure.

In the 2-step RACH procedure, the UE and BS need to distinguish a time for transmitting and receiving the fall-back signal for the 4-step RACH procedure and a time for retransmitting and receiving Msg A for the 2-step RACH procedure, distinguish the 2-step RACH procedure and the 4-step RACH procedure for a certain period of time, or distinguish between a plurality of 2-step RACH procedures for a certain period of time in order to correctly complete the access procedure. Hereinafter, the characteristics of the 2-step RACH procedure will be reviewed, and embodiments for solving the above-described problems will be described.

Decoding of Msg A

In the 2-step RACH procedure, since the PRACH preamble and the PUSCH are included in Msg A, the BS needs to determine whether the PRACH preamble and the PUSCH are successfully detected in order to determine whether Msg A is successfully received. When the UE transmits Msg A to the BS, the UE transmits the PRACH preamble before the PUSCH in time. Thus, considering that the BS first decodes the PRACH preamble, the decoding success/failure for Msg A of the BS may be classified as follows.

Case (1): PRACH preamble detection success and PUSCH detection success

Case (2): PRACH preamble detection success and PUSCH detection failure

Case (3): PRACH preamble detection failure

Among the above cases, Case (1) is a case in which the BS successfully decodes both the PRACH preamble and the PUSCH. In this case, the BS transmits Msg B to the UE in response to Msg A. If the UE correctly receives Msg B, the contention resolution procedure is completed, and thus the RACH procedure is also terminated.

Case (2) is a case in which the BS detects the PRACH preamble but does not detect the PUSCH. In this case, since the BS successfully receives the PRACH preamble including information such as the ID of the UE, the BS may transmit an RAR for fall-back back to the 4-step RACH procedure not to receive the PRACH preamble again. Thereafter, as in the normal 4-step RACH procedure, the UE transmits Msg 3 including the PUSCH to the BS, and the BS transmits Msg 4 including contention resolution information to complete the RACH procedure.

As another operation for Case (2), the BS may transmit Msg B to the UE by considering that the UE is monitoring the PDCCH for Msg B. In this case, Msg B may contain a message indicating Msg 3 transmission. In this case, if the UE receives the PDCCH for Msg B while monitoring PDCCHs, the UE decodes a related PDSCH and obtains an indicator for the Msg 3 transmission. When the UE is instructed to transmit Msg 3, the UE transmits Msg 3 including the PUSCH after a preparation time for transmitting the PUSCH. Thereafter, the BS transmits Msg 4 including the contention resolution information to complete the RACH procedure.

Case (3) is a case in which the BS does not detect the PRACH preamble. In this case, since the BS may not identify the UE, the BS may transmit no RAR or no Msg B to the UE. The UE may not also receive the corresponding signals. The UE determines that the BS does not properly receive Msg A and then performs a process of retransmitting Msg A.

Discussion of TC-RNTI

As in some examples of Case (1) or Case (2), the UE may require a temporary cell-RNTI (TC-RNTI) to monitor the PDDCH for Msg B. Therefore, from the perspective of the BS, allocating the TC-RNTI to each UE may be an issue in the 2-step RACH procedure. For example, if it is necessary to allocate the TC-RNTI to UEs monitoring the PDCCH for Msg B, whether the TC-RNTI is allocated on a UE group basis so that UEs in a certain group use a common TC-RNTI or whether the TC-RNTI is allocated to each UE so that each UE uses a different TC-RNTI may be problematic.

Although the present disclosure does not specifically describe TC-RNTI allocation methods, issues on the TC-RNTI mentioned regarding the 2-step RACH procedure, which is newly introduced in NR Rel-16, need to be further discussed.

RNTI Identification Method

In some examples of Case (1) or Case (2), it is necessary to define an RNTI used when the UE monitors the PDCCH for Msg B.

First, an RNTI used for PDCCH monitoring may be provided to the UE through the RAR. If the UE transmits the PRACH preamble to the BS and the BS successfully detects the PRACH preamble, the BS may send the preamble index (RAPID) of the detected PRACH preamble as a response. In this case, the BS may transmit the RNTI for the successfully detected RAPID through the RAR to the corresponding UE. If the UE receives the RAR and confirms that the RAPID is for the PRACH preamble transmitted by the UE and the RNTI related thereto is present, the UE may perform PDCCH monitoring for Msg B or PDCCH monitoring for other DL data based on the RNTI. Alternatively, the UE may perform UL data transmission based on a TC-RNTI. Further, the UE may use the indicated RNTI as the initial seed value of a scrambling sequence applied during data transmission.

When the UE and BS are performing the RACH procedure, the UE and BS need to be able to distinguish RNTIs for each RACH procedure and PDCCHs related thereto. For example, when the same RACH occasion (RO) is used for the 2-step RACH procedure and 4-step RACH procedure, the RA-RNTI may be the same even if a different preamble is used in each RACH procedure, and thus, it may be difficult for the UE to identify DCI for each RACH in performing PDCCH monitoring to receive the RAR. As another example, the RAR monitoring window of the 2-step RACH procedure is 10 ms longer than that of the legacy 4-step RACH procedure. In this case, an RA-RNTI generated according to a specific RO becomes the same as an RA-RNTI generated according to another RO existing at the same position after 10 ms. Therefore, although RA-RNTIs generated for individual ROs are used, the values thereof are the same, and thus, it may be difficult for the UE to identify the DCI in performing the PDCCH monitoring to receive the RAR. To solve the problem that RNTIs and PDCCHs related thereto are not identified as intended by the UE and BS due to the same RNTI, the following RNTI or PDCCH identification methods may be considered.

(1) Embodiment 1: Use of Conventional RA-RNTI Generation Formula

First, when the UE performs PDCCH monitoring for Msg B, an RNTI to be used by the UE may be generated based on a conventional RA-RNTI formula. The conventional formula for generating an RA-RNTI corresponding to a specific RO is as follows.

$$-\text{RA\_RNTI} = 1 + s\_id + 14 * t\_id + 14 * 80 * f\_id + 14 * 80 * 8 * ul\_carrier\_id$$

In the above formula, factors for generating the RA_RNTI such as s_id, t_id, f_id, and ul_carrier_id are related to resources for the specific RO. Specifically, s_id is a value indicating the first OFDM symbol index at which the specific RO starts and has an integer value of 0 to 13, and t_id is a value indicating the first slot index of a frame at which the specific RO starts (first slot index in the system frame) and has an integer value of 0 to 79. In addition, f_id is a value indicating the frequency domain index and has an integer value of 0 to 7, and ul_carrier_id is a value indicating whether a UL carrier is indicated and has a value of 0 or 1. For a UL carrier in a normal frequency band, the value of ul_carrier_id is 0, and for a UL carrier in a supplementary UL frequency band, the value of ul_carrier_id is 1.

Based on the above formula, a TC-RNTI related to an RO for transmitting a 2-step RACH preamble or a new RNTI related to the corresponding RO may be defined. In particular, a new RNTI value may be obtained by applying a predetermined offset to the conventional RNTI generation formula. For example, an RNTI may be generated by defining a parameter to be used after applying a predetermined offset to a parameter related to a time resource to which the RO for the 2-step RACH preamble is mapped. Here, applying the predetermined offset to the parameter related to the time resource in the conventional RNTI generation formula may be interpreted as 1) applying the offset to one specific time resource parameter or 2) comprehensively applying the offset to the conventional RNTI generation formula by considering that the conventional RNTI generation formula is related to the time resource.

As one method, the predetermined offset value applicable to the 2-step RACH procedure may be 14*80*8*2, and in this case, the formula for generating the new RA-RNTI may be defined as follows.

$$-\text{RA\_RNTI\_new} = 1 + s\_id + 14 * t\_id + 14 * 80 * f\_id + 14 * 80 * 8 * ul\_carrier\_id + 14 * 80 * 8 * 2$$

In the above formula, the applied offset value of 14*80*8*2 may be interpreted to mean 1) that the offset is applied as an offset for the parameter s_id indicating a symbol resource on the time resource or 2) that the offset is applied as an offset for the conventional RNTI generation formula by considering that the conventional RNTI generation formula is related to the time resource.

As another method, considering that there are a large number of unused indices in s_id or t_id having a predetermined range of values, indices except OFDM symbol indices and slot indices used for RO mapping through offset application may be used for RNTI generation.

If the RA-RNTI for the 4-step RACH procedure is generated based on a specific slot index and a starting position OFDM symbol index indicated by a RACH configuration table, the RA-RNTI for the 2-step RACH procedure may be generated by applying a predetermined offset to the slot index and the start OFDM symbol index indicated by the RACH configuration table. That is, parameters for generating the RA-RNTI for the 2-step RACH procedure may have values obtained by applying the predetermined offset to the slot index and OFDM symbol indices indicated by the RACH configuration table.

For example, a method of applying an offset to an OFDM symbol index may be considered. A RACH preamble using a short sequence consists of at least two OFDM symbols. For RACH preamble format A1, even OFDM symbol indices 0, 2, 4, 6, 8, 10, and 12 are used for a PRACH with a length of two OFDM symbols, and odd OFDM symbol indices 1, 3, 5, 7, 9, 11, and 13 are not used. Here, OFDM symbol indices used for the RA-RNTI of the 4-step RACH procedure are 0, 2, 4, . . . , 10, and unused OFDM symbol indices 1, 3, 5, . . . , 11 may be used to generate the RA-RNTI of the 2-step RACH procedure. In this case, it may be considered that an offset value of 1 is applied to the OFDM symbol index.

As another example, a method of applying an offset to a slot index may be considered. When the 4-step RACH procedure uses slots with an interval of 2 ms among slots with a duration of 10 ms in a 15 kHz frequency band, even-numbered slot indices such as 0, 2, 4, 6, and 8 may be used for the RNTI of the 4-step RACH procedure. In this case, odd-numbered slot indices such as 1, 3, 5, 7, and 9 are not used. Therefore, if these indices are used for the RNTI of the 2-step RACH procedure, the RNTI of the 2-step RACH procedure may be generated so as not to overlap with the RNTI of the 4-step RACH procedure even though the RNTIs have the same period of 10 ms. In this case, it may be considered that an offset value of 1 is applied to the OFDM symbol index.

If the value of at least one of s_id and t_id is selected by avoiding the RACH configuration used for the 4-step RACH procedure, at least 8 or more RNTIs distinguished from the RA-RNTI of the 4-step RACH procedure may be generated based on f_id. In addition, if the transmission times of the 2-step RACH preamble and 4-step RACH preamble are completely separated on a subframe basis, for example, if the 2-step RACH preamble is transmitted in the first 10 ms in a period of 20 ms and the 4-step RACH preamble is transmitted in the next 10 ms, it is possible to generate more RNTIs for distinguishment between the 2-step RACH procedure and the 4-step RACH procedure.

From a viewpoint similar to the above-described examples, a situation in which an offset is applied to a case in which the 4-step RACH procedure and the 2-step RACH procedure share the same RO may be considered. If the RO is the same, each factor to be used by default in the RA-RNTI generation formula may be the same. Therefore, in order to differentiate the RA-RNTI generation, if a specific slot index indicated by the RACH configuration is used for the same RO to generate the RA-RNTI of the 4-step RACH procedure, the RA-RNTI of the 2-step RACH procedure may be generated by using as a parameter an index obtained by applying a predetermined offset to the specific slot index.

As one method of applying the offset to the slot index, it may be considered that for indices 0 to 79 supported by the slot index t_id of the RA-RNTI generation formula, a different slot index range may be configured for each of the RA-RNTI of the 4-step RACH procedure and the RA-RNTI of the 2-step RACH procedure. In particular, the offset may be applied based on the fact that the number of slots in a frame varies according to the subcarrier spacing of a frequency band to which the RO is allocated. Specifically, if the subcarrier spacing of the frequency band to which the RO is allocated in Frequency Range 1 (FR1) is 15 kHz or 30 kHz, the t_id value used for the RA-RNTI of the 4-step RACH procedure is 0 to 39 depending on the number of slots in the frame according to the subcarrier spacing. Since values of 40 to 79 among the slot indices are not used, the RA-RNTI of the 2-step RACH procedure may use the corresponding indices from 40 to 79. Specifically, a new t_id value may be obtained by applying an offset value of 40 to the t_id value used for the RA-RNTI of the 4-step RACH procedure, and the new t_id value may be indicated as a parameter of the RA-RNTI of the 2-step RACH procedure. That is, assuming that the slot index used for the RA-RNTI of the 2-step RACH procedure is t_id_2 and the slot index used for the RA-RNTI of the 4-step RACH procedure is t_id_4, the relationship of t_id_2=t_id_4+40 may be configured. In this case, the RA-RNTI of the 4-step RACH procedure and the RA-RNTI of the 2-step RACH procedure use slot indices 0 to 39 and slot indices 40 to 79 among slot indices of 0 to 79, respectively, and thus the RA-RNTIs may be distinguished from each other.

As another method of applying the offset to the slot index, it may be considered that without distinguishing between slot indices that can be used by the RA-RNTI of the 4-step RACH procedure and the RA-RNTI of the 2-step RACH procedure, the RA-RNTIs may be enabled to use different indices. For example, if the slot indices of slots actually allocated for the RO common to the 4-step RACH procedure and the 2-step RACH procedure are indicated as 0, 2, 4, 6, 8, etc., the corresponding slot indices of 0, 2, 4, 6, 8, etc. may be used as parameters for the RA-RNTI of the 4-step RACH procedure. In addition, for the RA-RNTI of the 2-step RACH procedure, values such as 1, 3, 5, 7, 9, etc. obtained by adding an offset of 1 to the slot indices may be used as parameters. This method has an advantage in that the RA-RNTIs of the 4-step RACH procedure and the 2-step RACH procedure may be distinguished even with a small offset value depending on the slot indices of the slots to which the RO is actually allocated.

In addition, to apply the offset to the slot index, it may be considered that the number of slots in the frame varies depending on the subcarrier spacing of a frequency band to which the RO is allocated. If a RACH slot is indicated for 15 kHz or 60 kHz, indices 0, 1, 2, . . . , 9 are indicated with respect to 10 slots for 15 kHz, and indices 0, 1, 2, . . . , 39 are indicated with respect to 40 slots for 60 kHz. When a subcarrier spacing of 30 kHz or 120 kHz is used for the RO, it may be seen that two slots are respectively included in the slots indicated with respect to 15 kHz or 60 kHz. If one of the two slots is used to generate the RA-RNTI of the 4-step RACH procedure, the index of the remaining unused slot may be used to generate the RA-RNTI of the 2-step RACH procedure.

(2) Embodiment 2: Application of Offset for Each Predetermined Time Duration

In Embodiment 1, it has been described that when the RA-RNTI formula is used, if RNTIs need to be distinguished due to the same resource-related factors, the RNTIs may have different values. For example, according to Embodiment 1, the RA-RNTI of the 4-step RACH procedure and the RA-RNTI of the 2-step RACH procedure may have different values in the same time duration if the RA-RNTIs use different parameters based on an offset. However, when the same value is repeated at a periodicity of 10 ms for each RA-RNTI although the RA-RNTI of the 4-step RACH procedure is distinguished from the RA-RNTI of the 2-step RACH procedure, there may be identification problems if the monitoring window length for PDCCH detection becomes longer than 10 ms. That is, although a TC-RNTI related to an RO at a specific time or a new RNTI is generated, there may be a problem that TC-RNTIs or new RNTIs generated every 10 ms may overlap if there is another RO at the exact same location after durations of 10 ms, 20 ms, . . . , etc. from the specific time.

For example, when the 4-step RACH procedure is performed on an RO at a specific time in a U-band, it may be assumed that the length of an RAR monitoring window increases to 20 ms in preparation for delay in PDCCH transmission due to listen before talk (LBT). In this case, an RA-RNTI generated by the UE based on the RO at the specific time is used for a duration of 20 ms for PDCCH detection within the monitoring window. However, if another RO is present at the same location after 10 ms from the specific time, the above RA-RNTI may not be distinguished from an RA-RANTI for the other RO in a duration of 10 to 20 ms within the monitoring window.

As another example, when the 2-step RACH procedure is performed on an RO at a specific time, it may be assumed that the UE monitors both an RAR and Msg B. While the length of an RAR monitoring window is at most 10 ms, a contention resolution timer in Msg 4, which is applied to receive information included in Msg 4, is applied for a duration longer than 10 ms. In this case, an RA-RNTI generated by the UE based on the RO at the specific time is used during the duration for the contention resolution timer, which is longer than 10 ms. However, if another RO is present at the same location after 10 ms from the specific time, the above RA-RNTI may not be distinguished from an RA-RANTI for the other RO during the duration for the contention resolution timer, which is longer than or equal to 10 ms.

To solve the above-described RNTI identification problem, a method of applying a different time offset value when an RNTI for an RO is generated every 10 ms will be reviewed below.

The UE generates an RA-RNTI based on an RO at the time of transmitting a RACH preamble and then monitors a PDCCH for an RAR or Msg B based on the RA-RNTI. After a lapse of a predetermined time from when the UE determines to monitor the PDCCH, the UE newly calculates an RA-RNTI for monitoring the PDCCH for the corresponding RO. Here, the predetermined time, which corresponds to a reference time for calculating the RA-RNTI, may be 10 ms.

In this case, the RA-RNTI newly generated by the UE after the predetermined time needs to be different from the former. A method of applying an offset to a slot index or an OFDM symbol index to distinguish RA-RNTIs for the 4-step RACH procedure and 2-step RACH procedure may be used for the newly generated RA-RNT. For example, compared to the slot index t_id used in the formula for generating the RA-RNTI to monitor a first duration from 0 to 10 ms for a specific RO, a new RA-RNTI to monitor a duration from 10 to 20 ms may be determined as t_id+1, which is obtained by adding an offset value of 1 to t_id. In addition, a new RA-RNTI for monitoring a duration from 20 to 30 ms may be set to t_id+2, and a new RA-RNTI for monitoring a duration from 30 to 40 ms may be set to t_id+3.

Here, the offset set to 1 is merely an example, and the offset is not limited to 1. That is, various values according to the offset application method described above in the present disclosure may be applied.

The above method is not limited to the 2-step RACH procedure including PDCCH monitoring for Msg B, and the method may be similarly applied even when the PDCCH monitoring duration increases in the 4-step RACH procedure. For example, as described above, the length of an RAR monitoring window needs to increase to 10 ms or longer in preparation for delay in PDCCH transmission due to LBT when the 4-step RACH procedure is performed in a U-band. In this case, if a specific slot index or OFDM symbol index is used to calculate as a parameter an RA-RNTI for monitoring a first duration from 0 to 10 ms, an RA-RNTI for monitoring a next duration may be generated by using as a parameter a value obtained by applying a predetermined offset to the specific slot index or OFDM symbol index.

Alternatively, as another similar method, when a first RA-RNTI is created, the slot index of an RO is replaced with a slot index within a time duration of 20 ms (or more) and reflected as a parameter in the RA-RNTI calculation. For example, when the subcarrier spacing of a frequency band to which the RO is allocated is 15 kHz, the slot indices of 20 slots spanning two frames may be substituted with 0 to 19 and then used in the RA-RNTI calculation. However, in order to use RA-RNTIs according to this method, the BS and UE should accurately know the start and end of a time duration that is the basis for slot index substitution, (20 ms (or longer)) time duration in the above case). However, when the UE performs handover in an asynchronous network, the UE may obtain boundary information such as the start and end of a 10 ms time duration of a target cell, but the UE needs to obtain SFN information to secure information on the boundary of a time duration longer than 10 ms. Since the UE needs to decode a PBCH including the SFN information in order to acquire the SFN information, there is a possibility that latency may occur during the handover.

(3) Embodiment: Use of Information in PDCCH

On the other hand, when there is a problem in identifying RA-RNTIs, methods of distinguishing each RA-RNTI based on a PDCCH while using existing RA-RNTIs may be considered.

1) As one method of distinguishing each RA-RNTI based on the PDCCH, overlapping RA-RNTIs may be distinguished based on PDCCH scrambling sequences. The RNTI has a length of 16 bits, and the length of a CRC scrambled with the RNTI bits is 24 bits. In this case, each RA-RNTI may be identified by including identification information for each RNTI in some of 8 bits that remain after mapping the 16 RNTI bits among the 24 CRC bits. That is, the bits capable of specifying each RA-RNTI may be used for CRC scrambling while the 16 bits, which are commonly used for RNTIs, are maintained. In this case, the UE may interpret the additional specified bits to identify the RA-RNTIs.

For example, when RA-RNTIs of the 4-step RACH procedure and 2-step RACH procedure need to be distinguished from each other, the RA-RNTIs may be identified as follows. Considering that the RA-RNTIs of the 4-step RACH procedure are scrambled to the first 16 bits among 24 bits, information capable of identifying the RA-RNTIs of the 2-step RACH procedure may be added to the remaining 8 bits so that the RA-RNTIs of the 2-step RACH procedure may be identified. The UE determines that there is no information in the last 8 bits by scrambling the CRC related to the specific RNTI and determines that the RNTI is related to the 4-step RACH procedure. If the UE checks that there is no information in the last 8 bits after scrambling a CRC related to a specific RNTI, the UE determines that the corresponding RNTI is related to the 4-step RACH procedure. If the UE confirms that there is masking information in the last 8 bits, the UE determines that the RNTI is related to the 2-step RACH procedure.

As another example, when the same RNTI is used for an RAR and Msg B, the present method may be applied. In particular, extra 8 bits for identifying the RAR and Msg B may be configured based on details of CRC attachment defined in 3GPP TS 38.212 below.

7.3.2 CRC Attachment

Error detection is provided on DCI transmissions through a Cyclic Redundancy Check (CRC).

The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$, where A is the payload size and L is the number of parity bits. Let $a'_0, a'_1, a'_2, a'_3, \ldots, a'_{A+L-1}$, be a bit sequence such that $a'_i=1$ for $i=0, 1, \ldots, L-1$ and $a'_i = a_{i-L}$ for $i=L, L+1, \ldots, A+L-1$. The parity bits are computed with input bit sequence $a'_0, a'_1, a'_2, a'_3, \ldots, a'_{A+L-1}$ and attached according to Clause 5.1 by setting L to 24 bits and using the generator polynomial $g_{CRC24C}(D)$. The output bit $b_0, b_1, b_2, b_2, \ldots, b_{K-1}$ is $$b_k = a_k \text{ for } k = 0, 1, 2, \ldots, A-1$$

$$b_k = p_{k-A} \text{ for } k = A, A+1, A+2, \ldots, A+L-1.$$

where K=A+L.

After attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{K-1}$. The relation between $c_k$ and $b_k$ is:

$$c_k = b_k \text{ for } k = 0, 1, 2, \ldots, A+7$$

$$c_k = (b_k + x_{rnti,k-A-8}) \mod 2$$

$$\text{for } k = A+8, A+9, A+10, \ldots, A+23.$$

Referring to the above, when the 8 bits remaining after scrambling the 16 RNTI bits among the 24 CRC bits are additionally scrambled, the remaining 8 bits may be configured as follows.

$$c_k = b_k \text{ for } k = 0, \ldots, A-1$$

$$c_k = (b_k + x_{rnti,k-A}) \mod 2 \text{ for } k = A, \ldots, A+7$$

$$c_k = (b_k + x_{rnti,k-A-8}) \mod 2 \text{ for } k = A+8, \ldots, A+23$$

In the above equations, $b_0, b_1, \ldots, b_k$ denote output bits obtained by applying operations of parity bits $p_0, p_1, \ldots, p_{L-1}$ to information bits $a_0, a_1, \ldots, a_{A-1}$, and $c_0, c_1, \ldots, c_k$ denote CRC scrambled bits. In this case, previously used {0,0,0,0,0,0,0,0} may be used as Xmask used for the CRC scrambling operation. If additional Xmask is required, a bit string having at least one different bit such as {0,1,0,1,0,1, 0,1}, {0,0,0,0,0,0,0,1}, etc. may be used.

The method is not limited to when the RNTI is 16 bits. That is, the method may be applied even when the RNTI increases to 24 bits. In this case, a bit string in which a conventional RNTI with 16 bits and an RNTI using extended bits (e.g., 24 bits) are scrambled may be determined within a predetermined range of values.

As another example, when a PDCCH monitoring window is longer than 10 ms, additional information may be included in a PDCCH to identify repeated RNTIs. For example, information on a time duration of 10 ms may be included in the 8 bits remaining after mapping the 16 RNTI bits among the 24 CRC bits.

That is, even if the PDCCH monitoring window is longer than 10 ms, bit information capable of distinguish time durations such as a duration from 0 to 10 ms, a duration from 10 to 20 ms, a duration from 20 to 30 ms, or a duration from 30 to 40 ms with respect to a specific time may be included in the remaining 8 bits and then scrambled, so that the UE may be allowed to identify RNTIs. For example, when two bits among the remaining 8 bits are set to '00', it may indicate a duration of 0 to 10 ms from the time when the UE starts monitoring the PDCCH. When the two bits are set to '01', '10', and '11', it may indicate a duration from 10 to 20 ms, a duration of 20 to 30 ms, and a duration of 30 to 40 ms, respectively. In this case, even if the PDCCH monitoring window is longer than 10 ms, the UE may distinguish the overlapping RNTIs by interpreting the bit information depending on the time duration from the PDCCH monitoring start time.

2) As another method of distinguishing each RA-RNTI based on the PDCCH, overlapping RNTIs may be distinguished by reflecting a separate value for specifying a user in a demodulation reference signal (DMRS) sequence. That is, a method of initializing the DMRS sequence by using an RNTI and n_id as a seed value may be considered to configure the DMRS sequence. In general, when the RNTI is commonly used, the RNTI may be applied as the seed value. However, if users need to be distinguished, n_id capable of specifying the users may be additionally used together with the commonly used RNTI.

3) As a further method of distinguishing each RA-RNTI based on the PDCCH, overlapping RNTIs may be distinguished by the contents of the PDCCH. That is, information capable of identifying each RNTI may be included in some bits of DCI so as to indicate PDCCHs with different purposes for the same RNTI.

Specifically, when RA-RNTIs for PDCCHs of an RAR and Msg B overlaps with each other, information mapped to each RA-RNTI may be included in DCI. Thus, after detecting the PDCCHs, the UE may identify which PDCCH is related to with which message of the RAR and Msg B.

Alternatively, when it is necessary to distinguish between RA-RNTIs for the 4-step RACH procedure and 2-step RACH procedure, information on whether each RA-RNTI is for the 4-step RACH procedure or 2-step RACH procedure may be included in DCI. Thus, after detecting PDCCHs, the UE may identify a PDCCH related to the RACH procedure performed by the UE.

In addition, when the length of a monitoring window configured by the UE is longer than 10 ms for other reasons, it may be necessary to distinguish RA-RNTIs that are equally repeated for each 10 ms. In this case, information indicating which time duration each RA-RNTI is related to may be included in DCI. Thus, after detecting PDCCHs, the UE may properly identify the PDCCHs. As one method, lower N bits among bits for an SFN may be included in the DCI. Here, the SFN may be a frame number including an RO selected by the UE to transmit a RACH preamble. Specifically, N=2, and a maximum of four time durations may be distinguished by two bits represented by 00, 01, 10, and 11. As another method, information indicating each time duration with respect to a specific time may be included in the DCI. Regarding time durations for which the UE monitors PDCCHs to receive an RAR, time durations such as 0 to 10 ms, 10 to 20*10 ms, 2*10 to 3*10 ms, and 3*10 to 4*10 ms from a specific time, for example, a PDCCH monitoring start time or a RACH preamble transmission time may be identified by two bits represented by 00, 01, 10, and 11.

(4) Embodiment 4: Use of RAR Message/Msg B

The identification problem may occur when the same RA-RNTIs are repeated in a predetermined period of 10 ms. In this case, a method of including an RNTI indicator directly in the contents of an RAR message and/or Msg B may also be considered.

However, according to this method, upon receiving the RAR and/or Msg B, the UE may know the correct RNTI information. That is, this method may cause delay in the RACH procedure in that the RNTI information is recognized only when the RAR and/or Msg B is received.

(5) Embodiment 5: Use of Information on State of UE

In addition to the RNTI identification methods described above in Embodiments 1 to 4, a method of identifying RNTIs by additionally considering the state of the UE will be described.

An RO may be shared between the 4-step RACH procedure and the 2-step RACH procedure. In this case, a RACH preamble is allocated separately for each RACH procedure. When an RA-RNTI is generated based on the RO, it may be difficult for the UE to distinguish response signals if the UE receives responses for the two RACH procedures.

When the UE performs the 4-step RACH procedure, the UE may monitor a PDCCH for an RAR (Msg 2) from a slot in which the UE transmits the RACH preamble. In this case, a search space to be monitored may be an RAR search space indicated by the BS, and the UE monitors the PDCCH based on the RA-RNTI in a monitoring duration set to a maximum of 10 ms.

On the other hand, when the UE performs the 2-step RACH procedure, the UE may monitor a PDCCH for an RAR of the 2-step RACH procedure from a slot set to DL or flexible after a lapse of a predetermined time from transmission of an Msg A PUSCH or from the end point of an Msg A PUSCH group after the UE transmits an Msg A RACH preamble. In this case, a search space in which the UE monitors the PDCCH for the RAR of the 2-step RACH procedure may be a search space configured for the 4-step RACH procedure, or if a separate search space is designated for the 2-step RACH procedure, the corresponding search space may also be used. Here, RNTIs used may be classified according to the RRC connection state of the UE.

For example, when the UE is in the RRC connected state, a C-RNTI may be used for a PDCCH for reception of Msg B (success RAR), and an RA-RNTI may be used for a PDDCH for reception of an RAR indicating fallback at the same time. Alternatively, when the UE is in the RRC connected state, the RA-RNTI may be used for both the PDCCH for reception of Msg B and the PDCCH for reception of the RAR indicating fallback. In this case, it may be distinguished according to the above-described embodiments.

On the other hand, when the UE is in the RRC IDLE state or RRC INACTIVE state, the RA-RNTI may be used for the PDCCH for the RAR reception. For the corresponding RA-RNTI, the RA-RNTI for the 4-step RACH procedure and the RA-RNTI for the 2-step RACH procedure may be configured to have different values according to the above-described embodiments. Alternatively, the RA-RNTI for the 4-step RACH procedure and the RA-RNTI for the 2-step RACH procedure may be configured to have the same value. In this case, information for identifying the 2-step RACH procedure may be included in a specific bit string among 8 bits remaining after mapping 16 RA-RNTI bits among 24 CRC bits according to the above-described embodiments.

It has been described that the UE may identify the PDCCHs for the 4-step RACH procedure and 2-step RACH procedure based on the methods of identifying search spaces or RA-RNTIs to be monitored. However, considering the following issues: PDCCH monitoring for Msg B of the 2-step RACH procedure starts after transmission of a PUSCH occasion (PO) behind the RO; the monitoring duration may be longer than 10 ms; and the RA-RNTI is repeated every 10 ms, the UE identification problem, which is caused by repetition of the same value, still exists for RA-RNTIs for the 2-step RACH procedure. That is, there is a collision problem between the RA-RNTIs. To solve this problem, information on which RO or PO each RA-RNTI corresponds to may be indicated by a control signal such as DCI or an RAR. For example, lower N bits of an SFN may be used as bits indicating the information. Here, N has a value of 1 to 3. The value of N may be set differently depending on the starting time of an RAR monitoring window or a PDCCH search starting time. Alternatively, to identify the RA-RNTIs by distinguishing relative time durations from the RO, the time durations from the RO may be classified as M*10 ms (M=1, 2, 3, ..., 8), and the value of M may be provided as related information to indicate a corresponding time duration. The value of M is merely an example and is not limited to a value less than or equal to 8. That is, the value of M may be vary according to the number of relative time durations that need to be distinguished.

The usage of the above embodiments for identifying RNTIs may be summarized as follows.

1) According to each embodiment, it is possible to determine which RACH procedure a PDCCH monitored by the UE relates to by distinguishing RA-RNTIs of the 2-step RACH procedure and 4-step RACH procedure.

2) According to each embodiment, considering that both an RAR and Msg B should be monitored in the 2-step RACH procedure, the UE may distinguish an RA-RNTI for monitoring the RAR and an RA-RANTI for monitoring Msg B, thereby corresponding decoding a PDCCH.

3) According to each embodiment, when the length of a monitoring window becomes longer than 10 ms, an RA-RNTI related to a specific RO may be distinguished from an RA-RNTI related to an RO with the same OFDM symbol, slot, and frequency-domain position as the specific RO in a next 10 ms duration.

For example, when the length of a monitoring window increases to 20 ms, 30 ms, 40 ms, etc., which is longer than the current maximum of 10 ms because it is difficult to obtain an opportunity to transmit a PDCCH due to LBT in U-band transmission, the RNTI identification methods may be applied.

As another example, when the length of a monitoring window for Msg B of the 2-step RACH procedure is longer than 10 ms, the RNTI identification methods may be applied.

As another example, when an RA-RNTI for monitoring Msg B of the 2-step RACH procedure is generated in a bundle group of POs mapped to a specific RO, the RNTI identification methods may be applied to distinguish an RA-RNTI related to a specific PO group and an RA-RNTI related to another PO group. Here, a PO means UL time and frequency resources of Msg A for PUSCH transmission.

As another example, when an RA-RNTI for monitoring Msg B of the 2-step RACH procedure is generated for a specific RO, it may be considered that the start time of a monitoring window for Msg B is behind the time when a PUSCH is transmitted for Msg A. This is because the Msg A PUSCH is transmitted after an Msg A preamble and the time position of an Msg A PUSCH resource associated with the Msg A preamble may vary for each preamble. In this case, even if the monitoring window for Msg B is 10 ms, there may be a problem in RNTI identification because the corresponding monitoring window overlaps with a monitoring window for Msg B for an RO, which is located at the same position and has an offset of 10 ms from the specific RO. Such a problem may be solved by the RNTI identification methods.

As another example, the 2-step RACH procedure and the 4-step RACH procedure may share the same RO, and in this case, a UE performing the 2-step RACH procedure and a UE performing the 4-step RACH procedure may use the same RA-RNTI, which is determined based on the RO. Since each UE monitors each RAR window, RA-RNTIs of the 2-step RACH procedure and 4-step RACH procedure may be distinguished by applying the RNTI identification methods.

Monitoring of Preamble Non-Mapped to PUSCH Resource Unit (PRU)

There may be a preamble that is not mapped to a PRU among RACH preambles of the 2-step RACH procedure. Hereinafter, a method of configuring a monitoring time for the RACH preamble not mapped to the PRU will be described.

In the 2-step RACH procedure, Msg A is configured by mapping the RACH preamble of a specific RO and the PRU of a specific PO. While mapping is performed between ROs and POs or between RACH preambles and PRUs, some ROs may not be mapped to POs if the number of ROs is greater than the number of POs. That is, some preambles may not be mapped to PRUs. When the UE performs the 2-step RACH procedure, if the UE selects a preamble that is not mapped to a PRU and transmits Msg A at a specific time, a reference point of starting PDCCH monitoring for an RAR and/or Msg B may be problematic. In this case, the UE may determine the time of a PO that is not actually transmitted by the UE but expected to be related to an RO transmitted by the UE and perform monitoring after the corresponding time.

Alternatively, if the BS and UE know the presence of ROs that are not mapped to POs or the presence of RACH preambles that are not mapped to PRUs, the BS and UE may expect that PUSCH transmission and reception need to be separately performed for the corresponding ROs or RACH preambles. In this case, PDCCH monitoring may be performed after a slot in which a 2-step RACH preamble is transmitted as PDCCH monitoring starts after a slot in which a 4-step RACH preamble is transmitted. The UE may expect to receive an RAR including a fallback indication.

Figure 27:
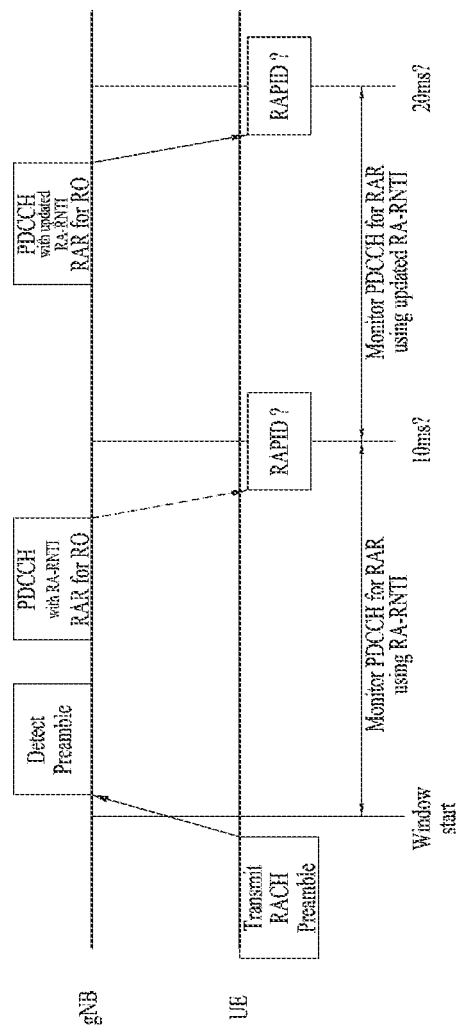
FIGS. 27 and 28 are diagrams illustrating exemplary radio network temporary identifier (RNTI) identification according to embodiments of the present disclosure.
Figure 28:
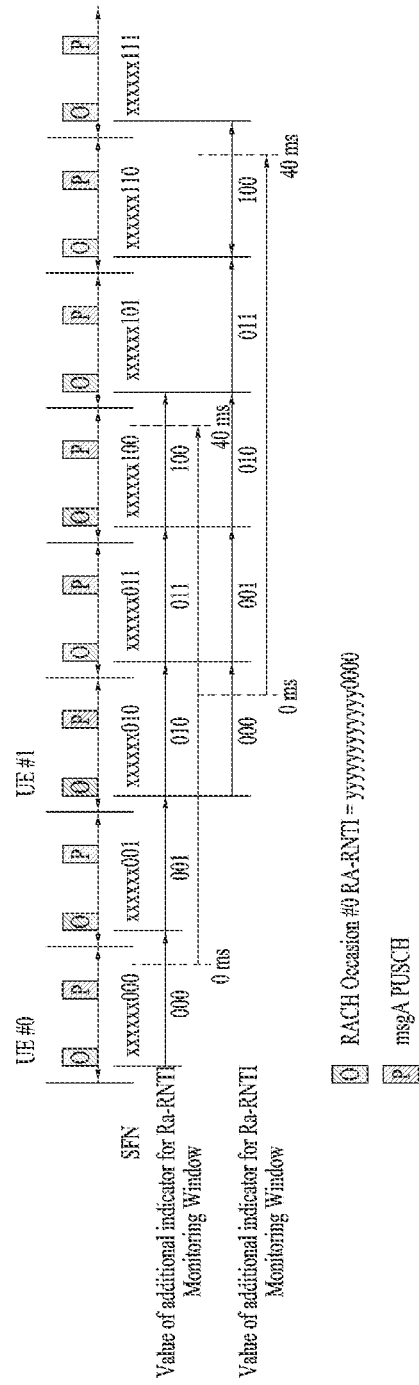

FIGS. 27 to 28 are diagrams illustrating examples of RNTI identification according to embodiments of the present disclosure.

FIG. 27 is a diagram illustrating a process in which the UE receives a PDCCH and an RAR by identifying an RNTI when the length of a monitoring window increases. In FIG. 27, the UE transmits a RACH preamble to the BS, and the BS detects the preamble. If the UE and BS uses a predetermined RA-RNTI for a duration from the start time of a PDCCH monitoring window to 10 ms, the UE and BS may transmit and receive the PDCCH and RAR based on another updated RA-RNTI for a next 10 ms duration. In this case, the updated RA-RNTI may be generated according to the above-described embodiments and features thereof.

FIG. 28 is a diagram illustrating an example of a method of identifying each RA-RNTI by including information on a time duration in DCI or an RAR message when the length of a monitoring window increases to 10 ms or longer. Referring to FIG. 28, when the BS transmits a PDCCH (or when the UE receives the PDCCH) in a slot within a range of 0 to 10 ms with respect to a RACH slot including an RO, the time information may be set to '000' bits. If the UE receives the PDCCH and detects the '000' bits, the UE may recognize the PDCCH as the response to a RACH signal transmitted on an RO within the range of 10 ms with respect to the RACH slot. In addition, when the BS transmits a PDCCH (or when the UE receives the PDCCH) in a slot within a range of 10 to 2*10 ms with respect to the RACH slot including the RO, the time information may be set to '001' bits. If the UE receives the PDCCH and detects the '001' bits, the UE may recognize the PDCCH as the response to a RACH signal transmitted on an RO within the range of 10 to 2*10 ms with respect to the RACH slot. Similarly, different bits may be configured for each 10 ms duration for other time ranges, so that upon receiving a PDCCH, the UE may recognize that the corresponding PDCCH is for a RACH signal transmitted on an RO in a certain time duration. Although three bits are used to separate time durations of 0 to 80 ms in the example of FIG. 28, the bit size is not limited to the three bits. That is, various bit sizes may be used depending on time durations to be separated.

On the other hand, a starting point at which time duration discrimination starts may be set to a slot in which RAR monitoring starts rather than the RACH slot including the RO. For example, in FIG. 28, when the BS transmits a PDCCH (or when the UE receives the PDCCH) in a slot within a range of 0 to 10 ms with respect to the slot in which the RAR monitoring starts, the time information may be set to '000' bits. If the UE receives the PDCCH and detects the '000' bits, the UE may recognize the PDCCH as the response to a RACH signal transmitted on an RO within the range of 10 ms with respect to the slot in which the RAR monitoring starts. In addition, when the BS transmits a PDCCH (or when the UE receives the PDCCH) in a slot within a range of 10 to 2*10 ms with respect to the slot in which the RAR monitoring starts, the time information may be set to '001' bits. If the UE receives the PDCCH and detects the '001' bits, the UE may recognize the PDCCH as the response to a RACH signal transmitted on an RO within the range of 10 to 2*10 ms with respect to the slot in which the RAR monitoring starts. Similarly, different bits may be configured for each 10 ms duration for other time ranges, so that upon receiving a PDCCH, the UE may recognize that the corresponding PDCCH is for a RACH signal transmitted on an RO in a certain time duration. The bit size is not limited to three bits. That is, various bit sizes may be used depending on time durations to be separated.

In addition to this, the reference point for time duration discrimination may be set to a slot in which monitoring of Msg B starts. Then, information on each time duration may be indicated by bits, or the relative difference between the number of a frame including an RO and the number of a frame in which a PDCCH is received may be indicated by bits.

Fallback Mechanism

As described above, in the 2-step RACH procedure, the BS needs to determine whether both a PRACH preamble and a PUSCH are successfully detected in order to determine whether the BS successfully receives Msg A. Hereinafter, a method of fall-back back to the 4-step RACH procedure when detection of a PRACH preamble or a PUSCH is not successful in the 2-step RACH procedure will be described.

(1) Use of RAR

In the 2-step RACH procedure, when the UE transmits Msg A to the BS, if the BS successfully detects a RACH preamble but fails to decode a PUSCH, it may be handled in the same way as when Msg 1 is transmitted from the UE to the BS in the 4-step RACH procedure. That is, after detecting the RACH preamble, the BS may transmit to the UE an RAR including a PUSCH decoding failure announcement, an Msg A retransmission request, and/or a fallback indication to the 4-step RACH procedure. From the perspective of the UE that expects to receive Msg B, after transmitting Msg A, the UE may attempt to detect a PDCCH related to the RACH preamble transmitted by the UE until reception of Msg B. Thus, even if the UE receives the RAR other than Msg B, it may not burden the UE. Therefore, in consideration of this point, the RAR may be used for the PUSCH decoding failure announcement, Msg A retransmission request, and/or fallback indication to the 4-step RACH procedure.

(2) Indication of Preamble Detection Success and PUSCH Decoding Success/Failure Through RAR In the 2-step RACH procedure, upon receiving Msg A including a RACH preamble and a PUSCH from the UE, the BS may attempt to detect the preamble and decode the PUSCH. If the preamble detection is successful, the BS decodes the PUSCH related to the preamble. Thereafter, the BS receives information bits through a CRC check. In this case, the BS may transmit, to the UE, information on whether the BS successfully receives the information bits or the BS fails to restore the information bits, through an RAR.

After successfully detecting the preamble, the BS transmits a random access preamble identifier (RAPID) to the UE. If the BS fails to decode the PUSCH, the BS may transmit information on a UL grant related to the RAPID, a timing advance (TA) command, and a TC-RNTI together with the RAPID of the detected preamble to the UE through the RAR. If the PUSCH decoding fails, the BS prepares for fall-back to the 4-step RACH procedure and transmission/reception of Msg 3 including the PUSCH. On the other hand, if the BS succeeds to decode the PUSCH, the BS may transmit, to the UE through the RAR, an indicator indicating that the PUSCH decoding is successful together with the TA command, TC-RNTI, and the like. The BS may inform the UE that the PUSCH decoding is successful by using some bits or code points of the RAR. Here, the code point used to indicate the PUSCH decoding success may be some states among a plurality of states expressed by bits used for the UL grant. The BS may then transmit a message for performing a contention resolution procedure through Msg B.

On the other hand, the UE monitoring a PDCCH with an RA-RNTI after transmitting Msg A may receive the RAR, check the RAPID of the preamble transmitted by the UE, and check whether RAPID detection is successful or whether PUSCH decoding is successful. If the UE checks that the RAPID detection is successful and the BS successfully decodes the PUSCH, the UE may obtain the TA command and TC-RNTI, use the TA command and TC-RNTI to monitor the PDCCH corresponding to Msg B, and use the TA command for UL transmission. In this case, the UE may perform a related procedure based on contention resolution information included in Msg B. On the other hand, if the UE checks that the RAPID detection is successful but the BS fails in the PUSCH decoding, the UE may obtain the TA command, TC-RNTI and UL grant and then performs Msg 3 transmission including the PUSCH.

In addition, if the UE confirms that the preamble transmitted by the UE is not successfully detected, the UE attempts to retransmit Msg A for the 2-step RACH procedure or attempt to transmit Msg 1 including the RACH preamble by fall-back to the 4-step RACH procedure. Similarly, if the UE receives no RAR within an RAR window, the UE attempts to retransmit Msg A for the 2-step RACH procedure or transmit Msg 1 including the RACH preamble by fall-back to the 4-step RACH procedure.

(3) Indication of Preamble Detection Success Through RAR and Indication of Fallback to 4-Step Msg 3 Through Msg B In the 2-step RACH procedure, when the UE transmits Msg A including a RACH preamble and a PUSCH, the UE performs operations for receiving a PDCCH for an RAR in an RAR monitoring window after the RACH preamble transmission, and operations for receiving a PDCCH for Msg B in an Msg B monitoring window after the PUSCH transmission. Here, the start time of the RAR monitoring window may be earlier than the start time of the Msg B monitoring window, and each monitoring window may have a different length. Also, the RAR monitoring window and the Msg B monitoring window may overlap in some time durations.

Upon receiving Msg A including the RACH preamble and the PUSCH from the UE, the BS attempts to detect the preamble and decode the PUSCH. If the RACH preamble detection is successful, the BS may indicate to the UE that the preamble detection is successful through the RAR. In this case, an indicator indicating that the preamble detection is successful may be additionally included in an existing RAR including an RAPID of the successfully detected preamble, a TA command, a UL grant, and a TC-RNTI. Some bits or code points of the RAR may be used for the indicator indicating that the preamble detection is successful. Here, the code points used for the indicator may use some states among a plurality of states expressed by bits used for the UL grant. In addition, the TA, TC-RNTI, etc. may be transmitted through the RAR. In some cases, the TA, TC-RNTI, etc. may be transmitted through Msg B. If the TA, TC-RNTI, etc. are transmitted through Msg B, bits for the TA and TC-RNTI in RAR may be reserved or used for other purposes.

When the UE receives the RAR through monitoring, the UE checks the RAPID of the preamble transmitted by the UE. If it is confirmed that the corresponding preamble is successfully detected, the UE continuously performs PDCCH monitoring for Msg B until the end of the Msg B monitoring window even after the RAR monitoring window ends. On the other hand, when the UE does not receive the RAR corresponding to the RAPID of the preamble transmitted by the UE within the RAR monitoring window, the UE retransmits Msg A, performs the RACH process again by fall-back to the 4-step RACH procedure, or attempts to access a new cell by searching for another cell ID.

When the BS succeeds to decode the PUSCH included in Msg A, the BS may transmit a message for performing a contention resolution procedure through Msg B. On the other hand, if the BS fails in the PUSCH decoding, the BS may transmit a UL grant for Msg 3 transmission through Msg B. If information on the TA command and TC-RNTI is already delivered to the UE through the RAR, Msg B may not include the information on the TA command and TC-RNTI. On the other hand, if the information on the TA command and TC-RNTI is not transmitted through the RAR, the information on the TA command and TC-RNTI may be included in Msg B. Here, a case in which the information on the TA command and TC-RNTI is transmitted through the RAR may include: 1) a case in which Msg B is transmitted to the UE earlier than the RAR; 2) a case in which only Msg B is transmitted to the UE; or 3) a case in which the RAR for the 2-step RACH procedure is configured not to include the TA command and the TC-RNTI.

On the other hand, after checking that the preamble detection is successful through the RAR, the UE continuously monitors Msg B. After receiving Msg B, the UE performs the contention resolution procedure or Msg 3 transmission.

Msg A Retransmission

If the UE does not receive Msg B in an Msg B monitoring window, the UE may retransmit Msg A. Msg A retransmission procedure of the 2-step RACH procedure is similar to Msg 1 retransmission procedure when the UE does not receive an RAR from the BS in legacy LTE. The Msg A retransmission may vary depending on how the timer and/or window length for monitoring Msg B is configured. For example, considering that RACH preamble transmission and PUSCH transmission are simultaneously performed in the 2-step RACH procedure, a method for configuring the start time of an Msg B monitoring window to be at least later than the start time of an RAR monitoring window may be considered. Even in the 2-step RACH procedure, since the BS may not detect both a RACH preamble and a PUSCH at the same time, the timer and/or window length for monitoring Msg B needs to be further discussed.

Figure 29:
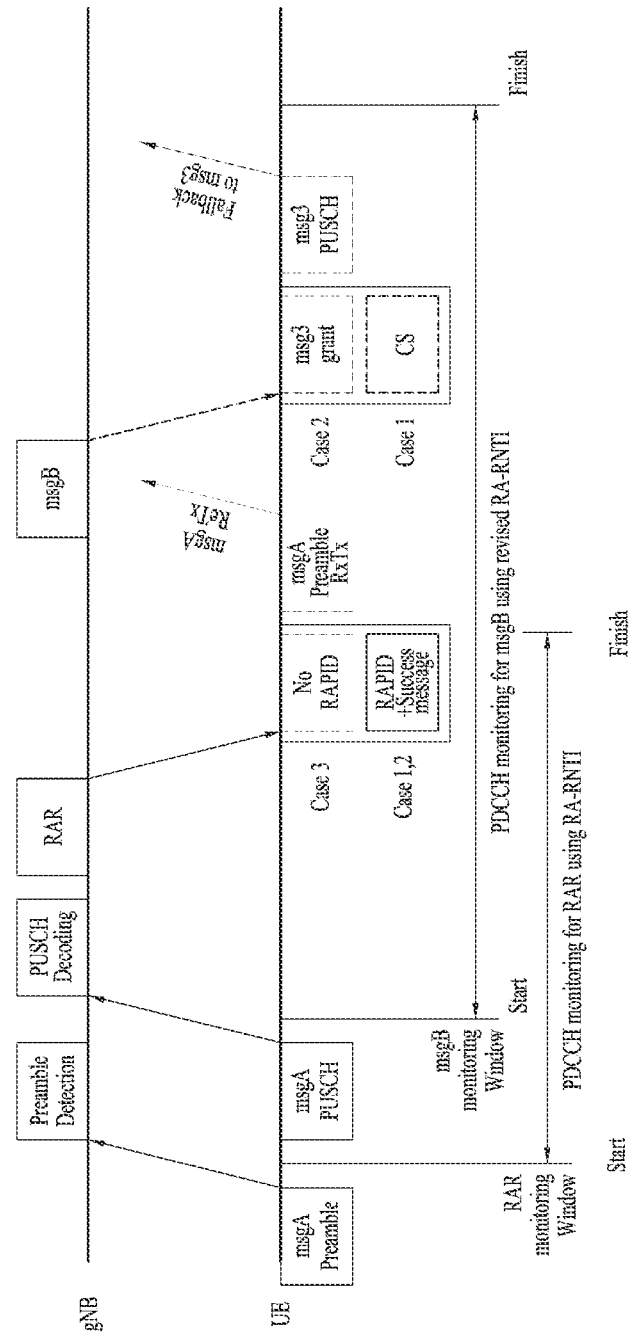
FIG. 29 is a diagram for explaining a fallback mechanism and a process for retransmitting message A (Msg A) in a 2-step RACH procedure according to an embodiment of the present disclosure.

FIG. 29 is a diagram for explaining a fall-back mechanism and a process for Msg A retransmitting in the 2-step RACH procedure according to an embodiment of the present disclosure. In FIG. 29, the UE transmits an Msg A preamble and an Msg A PUSCH, and monitors an RAR and Msg B using different RA-RNTIs. On the other hand, upon receiving Msg A, the BS attempts to detect the preamble and decode the PUSCH. After succeeding in detecting the PRACH preamble (Case 1 and Case 2), the BS may succeed in the PUSCH decoding (Case 1) or fail in the PUSCH decoding (Case 2). Or the BS may fail in the PRACH preamble (Case 3). A different RACH procedure may be performed for each case.

In Case 1, the BS may transmit, to the UE through the RAR, an RAPID for the preamble and an indicator indicating success of the PUSCH decoding. After checking the success of the PUSCH decoding of the BS, the UE may receive Msg B, perform a procedure related to contention resolution, and complete the 2-step RACH procedure.

In Case 2, the BS may transmit the RAPID for the preamble to the UE through RAR. However, the UE may not check whether the PUSCH decoding is successful, may check a failure of the decoding, or may be allocated a UL grant for PUSCH transmission through reception of Msg B.

That is, the fall-back to Msg 3 is performed and then the UE complete the RACH procedure by performing the 4-step RACH procedure.

In Case 3, the BS may not transmit the RAPID for the preamble to the UE through the RAR due to the failure of the preamble detection. The UE detecting no RAPID retransmits Msg A to the BS.

The various details, functions, procedures, proposals, methods, and/or operational flowcharts described in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

Figure 30:
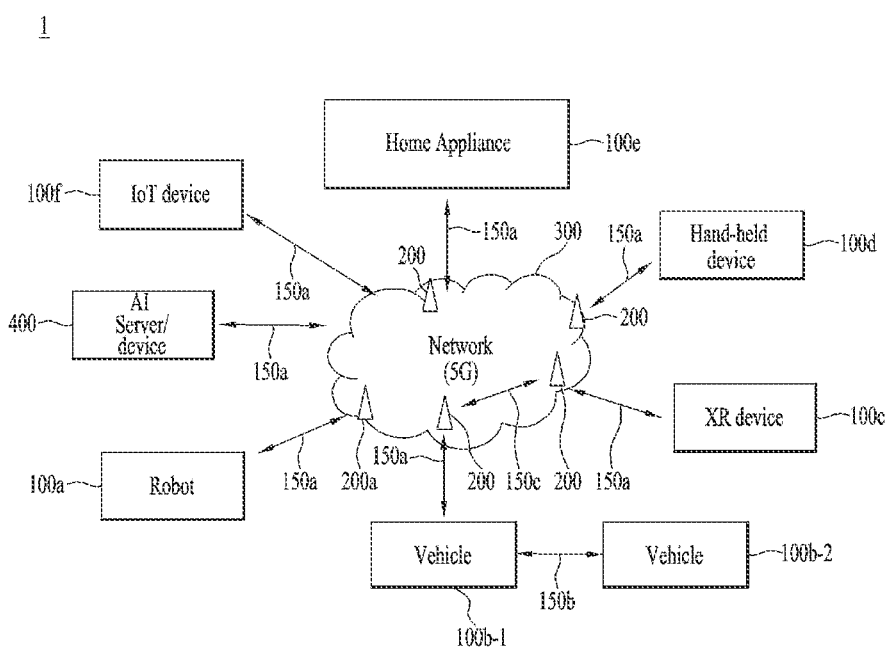
FIG. 30 illustrates an exemplary communication system to which embodiments of the present disclosure are applied.

FIG. 30 illustrates a communication system 1 applied to the present disclosure.

Referring to FIG. 30, the communication system 1 applied to the present disclosure includes wireless devices, BSs, and a network. The wireless devices are devices performing communication using RAT (e.g., 5G NR or LTE) and may be referred to as communication/radio/5G devices. The wireless devices may include, but not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television, a smartphone, a computer, a wearable, a home appliance, a digital signage, a vehicle, a robot, and so on. The hand-held device may include a smartphone, a smart pad, a wearable device (e.g., a smart watch or a smart glasses), and a computer (e.g., a laptop). The home appliance may include a television, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200 or the network 300, the wireless devices 100a to 100f may perform direct communication (e.g., sidelink communication) with each other without intervention of the BSs or the network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between BSs 200. The wireless communication/connections may be established through various RATs (e.g., 5G NR) such as UL/DL communication 150a, sidelink communication 150b (or, D2D communication), or inter-BS communication 150c (e.g. relay and integrated access backhaul (IAB)). Radio signals may be transmitted and received between the wireless devices, between the wireless devices and the BSs, and between the BSs through the wireless communication/connections 150a, 150b, and 150c. For example, signals may be transmitted and received on various physical signals through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals may be performed based on the various proposals of the present disclosure.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, gNode B (gNB), Node B, enhanced Node B (eNode B or eNB), access point, and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method for performing a 2-step random access channel (RACH) procedure and the apparatus therefor have been described in the context of a 5G New RAT system, the method and apparatus are also applicable to various other wireless communication systems.

The invention claimed is:

1. A method for performing a random access channel (RACH) procedure by a user equipment (UE) in a wireless communication system, the method comprising:

transmitting a message A including a physical random access channel (PRACH) preamble and a physical uplink shared channel (PUSCH) to a base station;

determining a radio network temporary identifier (RNTI) related to a RACH occasion in which the PRACH preamble is transmitted; and based on transmitting the message A, performing physical downlink control channel (PDCCH) monitoring for a message B based on the RNTI wherein the RNTI is determined as RNTI=1+s_id+ 14*t_id+14*80*f_id+14*80*8*ul_carrier_id+X, where s_id is an index of a first orthogonal frequency division multiplexing (OFDM) symbol of the RACH occasion, where 0≤s_id<14, where t_id is an index of a first slot of the RACH occasion in a system frame, where 0≤t_id<80, where f_id is an index of the RACH occasion in a frequency domain, where 0≤f_id<8, where ul_carrier_id is a value related to a uplink carrier used for a transmission of the PRACH preamble, where ul_carrier_id is 0 for normal uplink carrier and 1 for supplementary uplink carrier, and X is a predetermined offset.

2. A user equipment (UE) configured to transmit and receive a signal for performing a random access channel (RACH) procedure in a wireless communication system, the UE comprising:

at least one transceiver;

at least one processor; and at least one memory operably connected to the at least one processor and configured to store instructions that, when executed, cause the at least one processor to perform operations comprising:

transmitting a message A including a physical random access channel (PRACH) preamble and a physical uplink shared channel (PUSCH) to a base station;

determining a radio network temporary identifier (RNTI) related to a RACH occasion in which the PRACH preamble is transmitted; and based on transmitting the message A, performing physical downlink control channel (PDCCH) monitoring for a message B based on the RNTI, wherein the RNTI is determined as RNTI=1+s_id+ 14*t_id+14*80*f_id+14*80*8*ul_carrier_id+X, where s_id is an index of a first orthogonal frequency division multiplexing (OFDM) symbol of the RACH occasion, where 0≤s_id<14, where t_id is an index of a first slot of the RACH occasion in a system frame, where 0≤t_id<80, where f_id is an index of the RACH occasion in a frequency domain, where 0≤f_id<8, where ul_carrier_id is a value related to a uplink carrier used for a transmission of the PRACH preamble, where ul_carrier_id is 0 for normal uplink carrier and 1 for supplementary uplink carrier, and X is a predetermined offset.

3. The method of claim 1, further comprising:
receiving the message B based on the PDCCH monitoring.

4. The method of claim 1, wherein the PDCCH monitoring is performed within a time window configured for the message B.

5. The method of claim 4, further comprising:
based on not receiving the message B within the time window, performing a message A retransmission.

6. The UE of claim 2, wherein the operations further comprise:
receiving the message B based on the PDCCH monitoring.

7. The UE of claim 2, wherein the PDCCH monitoring is performed within a time window configured for the message B.

8. The UE of claim 7, wherein the operations further comprise:
based on not receiving the message B within the time window, performing a message A retransmission.

9. A base station (BS) configured to perform a random access channel (RACH) procedure with a user equipment (UE) in a wireless communication system, the BS comprising:

at least one processor; and at least one memory operably connected to the at least one processor and configured to store instructions that, when executed, cause the at least one processor to perform operations comprising:

receiving a message A including a physical random access channel (PRACH) preamble and a physical uplink shared channel (PUSCH);

determining a radio network temporary identifier (RNTI) related to a RACH occasion in which the PRACH preamble is received; and performing a physical downlink control channel (PDCCH) transmission for a message B based on the RNTI in response to the message A, wherein the RNTI is determined as RNTI=1+s_id+ 14*t_id+14*80*f_id+14*80*8*ul_carrier_id+X, where s_id is an index of a first orthogonal frequency division multiplexing (OFDM) symbol of the RACH occasion, where 0≤s_id<14, where t_id is an index of a first slot of the RACH occasion in a system frame, where 0≤t_id<80, where f_id is an index of the RACH occasion in a frequency domain, where 0≤f_id<8, where ul_carrier_id is a value related to a uplink carrier used for a transmission of the PRACH preamble, where ul_carrier_id is 0 for normal uplink carrier and 1 for supplementary uplink carrier, and X is a predetermined offset.

10. The BS of claim 9, wherein the operations further comprise:
transmitting the message B based on the PDCCH transmission.

11. The BS of claim 10, wherein the PDCCH transmission is performed within a time window configured for the message B.

12. The BS of claim 11, wherein the operations further comprise:
based on not transmitting the message B within the time window, receiving a message A retransmission from the UE.

* * * * *